(12) United States Patent
Resnick et al.

(10) Patent No.: US 11,341,351 B2
(45) Date of Patent: May 24, 2022

(54) METHODS AND APPARATUS FOR FACIAL RECOGNITION ON A USER DEVICE

(71) Applicant: 15 Seconds of Fame, Inc., Santa Monica, CA (US)

(72) Inventors: Adam Resnick, Boca Raton, FL (US); Ruslan Sabitov, Jersey City, NJ (US); Gregg Donnenfeld, Roslyn, NY (US)

(73) Assignee: 15 SECONDS OF FAME, INC., Santa Monica, CA (US)

( * ) Notice: Subject to any disclaimer, the term of this patent is extended or adjusted under 35 U.S.C. 154(b) by 45 days.

(21) Appl. No.: 16/829,709

(22) Filed: Mar. 25, 2020

(65) Prior Publication Data

US 2021/0209346 A1 Jul. 8, 2021

Related U.S. Application Data

(60) Provisional application No. 62/956,794, filed on Jan. 3, 2020.

(51) Int. Cl.
*G06K 9/00* (2022.01)
*G06T 7/73* (2017.01)
(Continued)

(52) U.S. Cl.
CPC ..... *G06K 9/00288* (2013.01); *G06K 9/00926* (2013.01); *G06T 7/74* (2017.01);
(Continued)

(58) Field of Classification Search
CPC .......... G06K 9/00288; G06K 9/00268; G06K 9/00221; G06K 9/00295; G06K 9/00926;
(Continued)

(56) References Cited

U.S. PATENT DOCUMENTS

| | | | |
|---|---|---|---|
| 5,144,685 | A | 9/1992 | Nasar et al. |
| 6,142,876 | A | 11/2000 | Cumbers |

(Continued)

FOREIGN PATENT DOCUMENTS

| | | |
|---|---|---|
| JP | 2003-317100 | 11/2003 |
| JP | 2010-009389 | 1/2010 |

(Continued)

OTHER PUBLICATIONS

Automatic Real-Time Photo Distribution for Mobile Devices (Year: 2016).*

(Continued)

*Primary Examiner* — Nizar N Sivji
(74) *Attorney, Agent, or Firm* — Carlson, Gaskey & Olds, P.C.

(57) ABSTRACT

An apparatus includes a memory of a user device and a processor of the user device. The processor is configured to capture an image using an image capture device of the user devices and broadcast a request signal within a range of the user device. The request signal is a request for facial data from compute devices within the range. The processor is configured to receive, in response to the request signal, facial data from each compute device from a set of compute devices within the range and perform, using the facial data received from each compute device from the set of compute devices, facial recognition on the image to identify a match between the facial data from a subset of compute devices from the set of compute devices and facial data from the image. The processor is configured to transmit the image to the subset of compute devices.

24 Claims, 11 Drawing Sheets

(51) Int. Cl.
*H04L 9/32* (2006.01)
*H04W 4/80* (2018.01)
*H04W 4/02* (2018.01)

(52) U.S. Cl.
CPC ............ *H04L 9/3231* (2013.01); *H04W 4/02* (2013.01); *H04W 4/80* (2018.02); *G06K 2009/00328* (2013.01); *G06K 2009/00953* (2013.01); *G06T 2207/30201* (2013.01)

(58) Field of Classification Search
CPC .......... G06K 2009/00328; G06K 2009/00953; G06T 2207/30201; G06T 7/337; G06T 7/74; H04L 63/0861; H04L 9/3231; H04W 4/80; H04W 4/02; H04W 4/029
See application file for complete search history.

(56) References Cited

U.S. PATENT DOCUMENTS

| | | | |
|---|---|---|---|
| 6,532,345 | B1 | 3/2003 | Gluck |
| 6,591,068 | B1 | 7/2003 | Dietz |
| 6,745,186 | B1 | 6/2004 | Testa et al. |
| 6,819,783 | B2 | 11/2004 | Goldberg et al. |
| 7,023,367 | B1 | 4/2006 | Manganaro et al. |
| 7,035,440 | B2 | 4/2006 | Kaku |
| 7,260,587 | B2 | 8/2007 | Testa et al. |
| 7,330,875 | B1 | 2/2008 | Parasnis et al. |
| 7,376,276 | B2 | 5/2008 | Shniberg et al. |
| 7,391,886 | B1 | 5/2008 | Clark et al. |
| 7,472,134 | B2 | 12/2008 | Kaku |
| 7,494,061 | B2 | 2/2009 | Reinhold |
| 7,526,106 | B1 | 4/2009 | Clark et al. |
| 7,532,811 | B2 | 5/2009 | Sauder |
| 7,552,228 | B2 | 6/2009 | Parasnis et al. |
| 7,561,723 | B2 | 7/2009 | Goldberg et al. |
| 7,619,660 | B2 | 11/2009 | Grosvenor |
| 7,684,651 | B2 | 3/2010 | Tang et al. |
| 7,783,085 | B2 | 8/2010 | Perlmutter et al. |
| 7,800,646 | B2 | 9/2010 | Martin |
| 7,860,347 | B2 | 12/2010 | Tang et al. |
| 7,881,968 | B2 | 2/2011 | David |
| 7,907,755 | B1 | 3/2011 | Perlmutter et al. |
| 7,953,690 | B2 | 5/2011 | Luo et al. |
| 7,965,908 | B2 | 6/2011 | Hayashi |
| 7,966,223 | B2 | 6/2011 | David |
| 7,995,806 | B2 | 8/2011 | Goh et al. |
| 8,014,572 | B2 | 9/2011 | Xiao et al. |
| 8,055,029 | B2 | 11/2011 | Petrescu et al. |
| 8,144,944 | B2 | 3/2012 | Ishii |
| 8,189,880 | B2 | 5/2012 | Wen et al. |
| 8,204,437 | B1 | 6/2012 | Rothschild |
| 8,233,679 | B2 | 7/2012 | Perlmutter et al. |
| 8,254,699 | B1 | 8/2012 | Zhao et al. |
| 8,260,674 | B2 | 9/2012 | David |
| 8,279,323 | B2 | 10/2012 | Ishii |
| 8,284,990 | B2 | 10/2012 | Ma et al. |
| 8,306,284 | B2 | 11/2012 | Goldberg et al. |
| 8,315,463 | B2 | 11/2012 | Gallagher et al. |
| 8,325,999 | B2 | 12/2012 | Kapoor et al. |
| 8,341,145 | B2 | 12/2012 | Dodson et al. |
| 8,392,957 | B2 | 3/2013 | Holt et al. |
| 8,406,481 | B2 | 3/2013 | Goldberg |
| 8,422,739 | B2 | 4/2013 | Ianculescu et al. |
| 8,560,625 | B1 | 10/2013 | Hardman et al. |
| 8,630,956 | B2 | 1/2014 | Arisawa et al. |
| 8,723,962 | B2 | 5/2014 | Herring et al. |
| 8,782,709 | B2 | 7/2014 | Wang et al. |
| 8,799,277 | B2 | 8/2014 | Park et al. |
| 8,825,872 | B2 | 9/2014 | Reisman |
| 8,831,275 | B2 | 9/2014 | Goldberg |
| 8,885,960 | B2 | 11/2014 | Sauve et al. |
| 8,898,464 | B2 | 11/2014 | Bono et al. |
| 8,928,760 | B2 | 1/2015 | Schultz et al. |
| 8,942,533 | B2 | 1/2015 | Wiklof |
| 8,949,619 | B2 | 2/2015 | Parry et al. |
| 8,957,981 | B2 | 2/2015 | Fredlund et al. |
| 9,007,420 | B1 | 4/2015 | Passe |
| 9,008,724 | B2 | 4/2015 | Lord |
| 9,104,907 | B2 | 8/2015 | Whitehill et al. |
| 9,131,147 | B2 | 9/2015 | Quardordt et al. |
| 9,189,682 | B2 | 11/2015 | Salvador et al. |
| 9,213,885 | B1 | 12/2015 | Schneiderman |
| 9,317,530 | B2 | 4/2016 | Papakipos et al. |
| 9,386,180 | B2 | 7/2016 | Oki |
| 9,396,354 | B1 | 7/2016 | Murphy et al. |
| 9,420,315 | B2 | 8/2016 | Melanson |
| 9,531,998 | B1 | 12/2016 | Farrell et al. |
| 9,652,663 | B2 | 5/2017 | Lau et al. |
| 9,668,002 | B1 | 5/2017 | Baron et al. |
| 9,712,800 | B2 | 7/2017 | St. Clair |
| 9,723,334 | B2 | 8/2017 | Melanson |
| 9,852,364 | B2 | 12/2017 | Liu et al. |
| 9,967,596 | B2 | 5/2018 | Melanson |
| 10,019,136 | B1 | 7/2018 | Ozog |
| 10,027,726 | B1 | 7/2018 | Ozog |
| 10,027,727 | B1 | 7/2018 | Ozog |
| 10,094,655 | B2 | 10/2018 | Sabitov et al. |
| 10,121,061 | B2 | 11/2018 | Dickinson et al. |
| 10,591,281 | B2 | 3/2020 | Sabitov et al. |
| 10,654,942 | B2 | 5/2020 | Resnick et al. |
| 2003/0023452 | A1 | 1/2003 | Novais et al. |
| 2003/0086123 | A1 | 5/2003 | Torrens-Burton |
| 2003/0118216 | A1 | 6/2003 | Goldberg |
| 2004/0008872 | A1 | 1/2004 | Goldberg |
| 2004/0156535 | A1 | 8/2004 | Goldberg et al. |
| 2005/0117022 | A1 | 6/2005 | Marchant |
| 2005/0254505 | A1 | 11/2005 | Chang et al. |
| 2005/0283497 | A1 | 12/2005 | Nurminen et al. |
| 2006/0020630 | A1 | 1/2006 | Stager et al. |
| 2006/0171603 | A1 | 8/2006 | Jung et al. |
| 2006/0229063 | A1 | 10/2006 | Koch |
| 2007/0003113 | A1 | 1/2007 | Goldberg |
| 2008/0091723 | A1 | 4/2008 | Zuckerberg et al. |
| 2008/0201327 | A1 | 8/2008 | Seth |
| 2008/0211904 | A1 | 9/2008 | Kato et al. |
| 2008/0243861 | A1 | 10/2008 | Wassingbo et al. |
| 2008/0260212 | A1 | 10/2008 | Moskal et al. |
| 2008/0310688 | A1 | 12/2008 | Goldberg |
| 2009/0043725 | A1 | 2/2009 | Gutta |
| 2009/0074258 | A1 | 3/2009 | Cotgreave |
| 2009/0103887 | A1 | 4/2009 | Choi et al. |
| 2009/0185723 | A1 | 7/2009 | Kurtz et al. |
| 2009/0252383 | A1* | 10/2009 | Adam ................ G06K 9/00288 382/118 |
| 2009/0316961 | A1 | 12/2009 | Gomez Suarez et al. |
| 2010/0036875 | A1 | 2/2010 | Miezianko et al. |
| 2010/0060727 | A1 | 3/2010 | Steinberg et al. |
| 2010/0150407 | A1 | 6/2010 | Cheswick |
| 2010/0158315 | A1 | 6/2010 | Martin |
| 2010/0172550 | A1 | 7/2010 | Gilley et al. |
| 2010/0207721 | A1 | 8/2010 | Nakajima et al. |
| 2010/0216441 | A1 | 8/2010 | Larsson et al. |
| 2010/0239130 | A1* | 9/2010 | Chen ................ G06K 9/00979 382/118 |
| 2010/0241658 | A1 | 9/2010 | Rathurs et al. |
| 2011/0013810 | A1 | 1/2011 | Engstrom et al. |
| 2011/0022529 | A1 | 1/2011 | Barsoba et al. |
| 2011/0064281 | A1 | 3/2011 | Chan |
| 2011/0066743 | A1 | 3/2011 | Hurley et al. |
| 2011/0142016 | A1 | 6/2011 | Chatterjee |
| 2011/0182482 | A1 | 7/2011 | Winters et al. |
| 2011/0182485 | A1 | 7/2011 | Shochat et al. |
| 2011/0188713 | A1 | 8/2011 | Chin et al. |
| 2011/0211736 | A1 | 9/2011 | Krupka et al. |
| 2011/0211737 | A1 | 9/2011 | Krupka et al. |
| 2011/0238755 | A1 | 9/2011 | Khan et al. |
| 2011/0282860 | A1 | 11/2011 | Baarman et al. |
| 2011/0307399 | A1 | 12/2011 | Russell et al. |
| 2012/0008837 | A1 | 1/2012 | Goldberg et al. |
| 2012/0027256 | A1 | 2/2012 | Kiyohara et al. |
| 2012/0056722 | A1 | 3/2012 | Kawaguchi |
| 2012/0250950 | A1 | 10/2012 | Papakipos et al. |
| 2012/0278395 | A1 | 11/2012 | Garcia |

(56) References Cited

U.S. PATENT DOCUMENTS

| | | | |
|---|---|---|---|
| 2013/0040660 A1 | 2/2013 | Fisher et al. | |
| 2013/0089243 A1 | 4/2013 | Sauve et al. | |
| 2013/0117365 A1 | 5/2013 | Padmanabhan et al. | |
| 2013/0136316 A1 | 5/2013 | Grassel et al. | |
| 2013/0188844 A1 | 7/2013 | Goldberg | |
| 2013/0194438 A1 | 8/2013 | Sweet, III et al. | |
| 2013/0265448 A1 | 10/2013 | Li | |
| 2013/0265450 A1 | 10/2013 | Barnes, Jr. | |
| 2013/0269013 A1 | 10/2013 | Parry et al. | |
| 2013/0286223 A1 | 10/2013 | Latta et al. | |
| 2014/0028201 A1 | 1/2014 | Chang | |
| 2014/0055553 A1* | 2/2014 | Lee | G06K 9/00979 348/14.07 |
| 2014/0064576 A1 | 3/2014 | Gong et al. | |
| 2014/0250126 A1 | 9/2014 | Baldwin et al. | |
| 2014/0267618 A1 | 9/2014 | Esteban et al. | |
| 2014/0289534 A1* | 9/2014 | Parry | H04L 63/0428 713/186 |
| 2014/0342330 A1 | 11/2014 | Freeman et al. | |
| 2014/0350840 A1 | 11/2014 | D'Argenio et al. | |
| 2014/0361974 A1 | 12/2014 | Li et al. | |
| 2015/0057995 A1 | 2/2015 | Neumann et al. | |
| 2015/0062334 A1 | 3/2015 | Dickinson et al. | |
| 2015/0066920 A1 | 3/2015 | Barta | |
| 2015/0081785 A1 | 3/2015 | Angelsmark et al. | |
| 2015/0081791 A1 | 3/2015 | Jacobs | |
| 2015/0124107 A1 | 5/2015 | Muriello et al. | |
| 2015/0169946 A1 | 6/2015 | Needleman | |
| 2015/0172787 A1 | 6/2015 | Geramifard | |
| 2015/0172853 A1 | 6/2015 | Liu et al. | |
| 2015/0181379 A1 | 6/2015 | Pai et al. | |
| 2015/0227609 A1 | 8/2015 | Shoemaker et al. | |
| 2015/0227780 A1* | 8/2015 | Tussy | G06F 16/583 382/118 |
| 2015/0227782 A1 | 8/2015 | Salvador et al. | |
| 2015/0286856 A1 | 10/2015 | Garcia et al. | |
| 2015/0304368 A1 | 10/2015 | Vaccari et al. | |
| 2015/0347827 A1 | 12/2015 | Dickinson et al. | |
| 2016/0026853 A1 | 1/2016 | Wexler et al. | |
| 2016/0071101 A1 | 3/2016 | Winarski | |
| 2016/0073010 A1 | 3/2016 | Cronin et al. | |
| 2016/0105772 A1 | 4/2016 | Cohen | |
| 2016/0150124 A1 | 5/2016 | Panda et al. | |
| 2016/0182816 A1 | 6/2016 | Luk et al. | |
| 2016/0191434 A1 | 6/2016 | Rice | |
| 2016/0205358 A1 | 7/2016 | Dickinson | |
| 2016/0247015 A1* | 8/2016 | Lee | G06K 9/00295 |
| 2017/0017834 A1* | 1/2017 | Sabitov | G06K 9/00718 |
| 2017/0192401 A1 | 7/2017 | Wexler et al. | |
| 2018/0025220 A1 | 1/2018 | Dickinson et al. | |
| 2018/0035074 A1* | 2/2018 | Barnes, Jr. | H04N 21/8106 |
| 2018/0041693 A1* | 2/2018 | Saraya | H04N 1/4493 |
| 2018/0189571 A1 | 7/2018 | Seo et al. | |
| 2018/0232564 A1* | 8/2018 | Berookhim | H04W 4/023 |
| 2018/0234709 A1 | 8/2018 | Melanson | |
| 2018/0300554 A1 | 10/2018 | Kansara | |
| 2018/0341835 A1 | 11/2018 | Siminoff | |
| 2019/0012442 A1* | 1/2019 | Hunegnaw | G06K 9/00228 |
| 2019/0034710 A1 | 1/2019 | Dickinson et al. | |
| 2019/0043281 A1* | 2/2019 | Aman | G07C 9/00896 |
| 2019/0043351 A1 | 2/2019 | Yang et al. | |
| 2019/0045207 A1 | 2/2019 | Chen et al. | |
| 2019/0087646 A1 | 3/2019 | Goulden et al. | |
| 2019/0137261 A1 | 5/2019 | Sabitov et al. | |
| 2019/0179960 A1 | 6/2019 | Im et al. | |
| 2020/0074151 A1 | 3/2020 | Resnick et al. | |
| 2020/0217645 A1 | 7/2020 | Sabitov et al. | |
| 2020/0285839 A1 | 9/2020 | Donnenfeld | |

FOREIGN PATENT DOCUMENTS

| | | |
|---|---|---|
| JP | 2012-507761 | 3/2012 |
| WO | WO 2009/123711 | 10/2009 |
| WO | WO 2011/017653 | 2/2011 |
| WO | WO 2011/097041 | 8/2011 |
| WO | WO 2012/112992 | 8/2012 |
| WO | WO 2012/134756 | 10/2012 |
| WO | WO 2012/142054 | 10/2012 |
| WO | WO 2012/149397 | 11/2012 |
| WO | WO 2014/043738 | 3/2014 |
| WO | WO 2014/100519 | 6/2014 |
| WO | WO 2015/030911 | 3/2015 |
| WO | WO 2015/031863 | 3/2015 |
| WO | WO 2015/085246 | 6/2015 |

OTHER PUBLICATIONS

Method to identify subjects in a photo without using facial recognition analysis (Year: 2014).*

Method by Which Information is Shared Given a Time, Date, or Location To Enhance Historical Significance of Web Based Content (Year: 2014).*

Providing a Camera Stream on an Ancillary Display (Year: 2018).*

International Search Report and Written Opinion issued by the International Searching Authority for Application No. PCT/US2020/021447, dated May 19, 2020, 15 pages.

Office Action issued by the Japanese Patent Office for Application No. 2018-520402, dated Jun. 10, 2020, 7 pages including English translation.

Office Action issued by the Brazilian Patent Office for Application No. BR112018007979-0, dated Jul. 14, 2020, 5 pages including informal English translation.

Office Action for U.S. Appl. No. 15/211,261, dated Nov. 30, 2017, 15 pages.

Office Action for U.S. Appl. No. 15/299,934, dated May 24, 2018, 15 pages.

Final Office Action for U.S. Appl. No. 15/299,934, dated Dec. 6, 2018, 19 pages.

Office Action for U.S. Appl. No. 15/299,934, dated Jul. 26, 2019, 17 pages.

International Search Report and Written Opinion for International Application No. PCT/US2016/042489, dated Oct. 21, 2016, 7 pages.

International Search Report and Written Opinion for International Application No. PCT/US2016/058189, dated Jan. 13, 2017, 8 pages.

International Search Report and Written Opinion for International Application No. PCT/US2019/048555, dated Nov. 29, 2019, 13 pages.

Extended Search Report for European Application No. 16825245.0, dated Mar. 20, 2019, 8 pages.

Extended European Search Report for European Application No. 16794804.1, dated Jul. 31, 2019, 14 pages.

Supplementary European Search Report for European Application No. 16794804.1, dated Apr. 30, 2019, 17 pages.

Office Action issued by the Japanese Patent Office for Application No. 2018-521489, dated Dec. 9, 2019, 11 pages, including English translation.

PR Newswire, FacialNetwork Releases New Demo of Facial Recognition App NameTag on Google Glass, Receives Cease and Desist from Facebook, Sep. 10, 2014, Retrieved from Internet: http://www.prnewswire.com/news-releases/facialnetwork-releases-new-demo-of-facial-recognition-app-nametag-on-google-glass-receives-cease-and-desist-from-facebook-274649581.html, 4 pages.

Penny Crosman, Biometric Tipping Point: USAA Deploys Face, Voice Recognition, Feb. 3, 2015. Retrieved from the Internet: http://www.americanbanker.com/news/bank-technology/biometric-tipping-point-usaa-deploys-face-voice-recognition-1072509-1.html?zkPrintable=1&nopagination=1, 7 pages.

Ironic Sans, Idea: Fun with facial recognition, Jan. 11, 2007. Retrieved from the Internet: http://www.ironicsans.com/2007/01/idea_fun_with_facial_recogniti.html, 5 pages.

Katy Daniells, FaceLook: Coca-Cola's Facial Recognition App, Aug. 2, 2011. Retrieved from the Internet: http://www.digitalbuzzblog.com/facelook-coca-colas-facial-recognition-app/, 12 pages.

Collen Kriel, Alibaba shows off facial recognition to secure mobile payments, Mar. 16, 2015. Retrieved from the Internet: http://

(56) References Cited

OTHER PUBLICATIONS siliconangle.com/blog/2015/03/16/alibaba-shows-off-facial-recognition-to-secure-mobile-payments/, 5 pages.
Co tree, Selfies—Automatic selfie by multiple faces detection, Released Mar. 26, 2015, Retrieved from the Internet: https://itunes.apple.com/us/app/selfies-automatic-selfie-by/id976846726?mt=8, 2 pages.
Julian Mitchell, Staples Center, AEG and Fanpics Partner to Put Fans at the Center of Major Sports Moments, May 27, 2015. Retrieved from the Internet: http://www.forbes.com/sites/julianmitchell/2015/05/27/staples-center-and-fanpics-team-up-putting-fans-at-the-center-of-major-sports-moments/2/#60ccf4ceba08, 5 pages.
Mori Rothman, Bringing facial recognition technology to the 'kiss cam' at sporting events, PBS Newshour, Sep. 24, 2013, Retrieved from the Internet: http://www.pbs.org/newshour/rundown/dhs-taps-into-crowd-cam-for-facial-recognition-research/, 2 pages.
Justin Lee, Securus patents facial recognition system for video visitation sessions, BiometricUpdate.com. Jun. 16, 2015. Retrieved from the Internet: http://www.biometricupdate.com/201506/securus-patents-facial-recognition-system-for-video-visitation-sessions, 3 pages.
Edgar Cervantes, Facebook will recognize you in photos where your face is not showing, Android Authority, Jun. 23, 2015. Retrieved from the Internet: http://www.androidauthority.com/facebook-recognize-photos-without-face-618957/, 5 pages.
ZoOmTM, The World's First Secure Selfie 3D Authentication App, Announced by FacialNetwork, Jul. 8, 2015. Retrieved from the Internet: http://www.marketwatch.com/story/zoomtm-the-worlds-first-secure-selfie-3d-authentication-app-announced-by-facialnetwork-2015-07-08, 9 pages.
Ryan Whitwam, Facebook developing way to fingerprint the camera you used to take a photo, Sep. 20, 2015. Retrieved from the Internet: http://www.geek.com/news/facebook-developing-way-to-fingerprint-the-camera-you-used-to-take-a-photo-1634542/, 3 pages.
Seatrade Cruise News, The Image Group provides photo buyers mobile-friendly instant gratification, Nov. 8, 2015. Retrieved from the Internet: http://www.seatrade-cruise.com/news/news-headlines/image-provides-photo-buyers-mobile-friendly-instant-gratification.html, 2 pages.
Planet biometrics, Facial recognition startup will scour web for user images, Feb. 3, 2016. Retrieved from the Internet: http://www.planetbiometrics.com/article-details/i/4100/desc/facial-recognition-startup-will-scour-web-for-user-images/, 2 pages.
Ashley Gurbal Kritzer, Tampa Bay Business Journal, Vinik— backed Seattle startup brings new tech to Amalie Arena for Lightning games, Feb. 5, 2016. Retrieved from the Internet: http://www.bizjournals.com/tampabay/blog/morning-edition/2016/02/vinik-backed-seattle-startup-brings-new-tech-to.html,A171, 4 pages.
PR Newswire, Waldo Photos Closes $5 Million Seed Funding Round Led by Upfront Ventures, Jan. 21, 2016. Retrieved from the Internet: https://www.prnewswire.com/news-releases/waldo-photos-closes-5-million-seed-funding-round-led-by-upfront-ventures-300206555.html, 2 pages.
Texas TechPulse, Waldo Photos: Finding Your Photos in the Proverbial Haystack, Feb. 3, 2016. Retrieved from the Internet: http://www.texastechpulse.com/waldo_photos_finding_your_photos_in_the_proverbial_haystack/s-0063812.html, 3 pages.
Rachel Metz, A New Way to Use Facial Recognition to Find Photos of You, Feb. 2, 2016, MIT Technology Review. Retrieved from the Internet: https://www.technologyreview.com/s/600690/a-new-way-to-use-facial-recognition-to-find-photos-of-you/, 3 pages.
Colin Morris, HomeAdvisor co-founders launch photo marketplace powered by facial recognition, Built in Austin, Jan. 22, 2016. Retrieved from the Internet: http://www.builtinaustin.com/2016/01/22/waldo-photos-5-million-seed-round, 3 pages.
PR Rocket, Photo-Sharing Image Recognition Tools Advocacy Campaign Launched by ScanMyPhotos.com, Mar. 8, 2016. Retrieved from the Internet: http://www.pressreleaserocket.net/photo-sharing-image-recognition-tools-advocacy-campaign-launched-by-scanmyphotos-com/419781/, 3 pages.
Taylor Soper, Ex-Microsoft manager raises cash from sports team owners to enhance the fan experience at live games, GeekWire, Feb. 4, 2016. Retrieved from the Internet: http://www.geekwire.com/2016/ex-microsoft-manager-raises-cash-sports-team-owners-enhance-fan-experience-live-games/, 16 pages.
Dave Gershgorn, A New App Automatically Sends That Group Photo to Your Friends, Popular Science, Mar. 7, 2016. Retrieved from the Internet: http://www.popsci.com/new-app-automatically-sends-that-group-photo-to-your-friends, 2 pages.
Rob Price, Snapchat has figured out a way to use facial recognition tech to protect people's privacy, Business Insider, Jul. 19, 2016. Retrieved from the Internet: http://www.businessinsider.com/new-snapchat-patent-uses-facial-recognition-tech-protect-privacy-photos-blurring-emojis-2016-7, 6 pages.
The Ghost in the Camera, How facial recognition technology mines your face for information, Feb. 2016,1 page.
Computerworld, Face Recognition app FindFace may make you want to take down all your online photos, May 18, 2016, 3 pages.
Kim Brunhuber, Facial recognition tech is allowing stores to reward customers, CBC News, May 2, 2016, 5 pages.
Sarah Perez, Lambda Labs Is Launching A Facial Recognition API For Google Glass, May 23, 2013. Retrieved from the Internet: http://techcrunch.com/2013/05/23/lambda-labs-is-launching-a-facial-recognition-api-for-google-glass/, 15 pages.
Doug Bolton, FindFace app which uses facial recognition to identify strangers on social media takes Russia by storm, May 18, 2016. http://www.independent.co.uk/life-style/gadgets-and-tech/news/findface-vk-app-social-media-facial-recognition-android-ios-a7035556.html, 2 pages.
Michelle Ma, Moving cameras talk to each other to identify, track pedestrians, Nov. 12, 2014. Retrieved from the Internet: http://www.washington.edu/news/2014/11/12/moving-cameras-talk-to-each-other-to-identify-track-pedestrians/, 6 pages.
Ben Coxworth, "Software could determine where a video was shot, based on scenery and ambient sound," Feb. 19, 2015, Gizmag.com, retrieved from the internet at http://www.gizmag.com/video-geolocation- IQorithms/36172 on Oct. 6, 2015, 3 pages.
Osnap, Tutorial 2: Time-Lapse - Daily Self Portrait, Retrieved Nov. 30, 2016 from the Internet: http://www.osnapphotoapp.com/tutorial2.php, 6 pages.
Fanpics, Tell Your Story. Retrieved Nov. 30, 2016 from the Internet: https://www.fanpics.com/about, 3 pages.
Waldo Photos, Retrieved from the Internet: https://waldo.photos/, published Oct. 9, 2016, Retrieved Nov. 30, 2016, 3 pages.
Sarah Perez, Waldo Raises $5 Million For A Photo-Finding Platform Targeting Professional Photographers & Events, TechCrunch, Jan. 21, 2016. Retrieved from the Internet: Dec. 2, 2016 at https://techcrunch.com/2016/01/21/waldo-raises-5-million-for-a-photo-finding-platform-targeting-professional-photographers-events/, 9 pages.
Magtoapp, Inc., iTunes Preview, Celebtwin: Celebrity Look Alike Lite. Updated Jul. 5, 2016, Retrieved Dec. 2, 2016 from the Internet: https://itunes.apple.com/us/app/celebtwin-celebrity-look-alike/id381722077?mt=8, 2 pages.
Lamdba Labs, API Documentation. Retrieved from the Internet on Jan. 17, 2019 at https://lambdal.com/api-documentation, 2 pages.
Knoto, published 2016, Retrieved Dec. 12, 2016 from the Internet: http://knoto.com/, 5 pages.
Naaman, et al. Stanford University, "Leveraging Context to Resolve Identity in Photo Albums", 2005, 10 pages.
Amy Held, Google App Goes Viral Making an Art Out of Matching Faces to Paintings, Jan. 15, 2018, NPR.org, Retrieved from the Internet: https://www.npr.org/sections/thetwo-way/2018/01/15/578151195/google-app-goes-viral-making-an-art-out-of-matching-faces-to-paintings, 8 pages.
Chris Welch, How to Stop Facebook from Looking for You With Face Recognition, Mar. 27, 2018. Retrieved from the Internet: https://www.theverge.com/2018/3/27/17165150/facebook-face-recognition-how-to-turn-off-disable, 6 pages.
Vlad Savov, Sony Promises Better Face Identification Through Depth-Sensing Lasers, Jan. 2, 2019. Retrieved from the Internet: https://www.theverge.com/2019/1/2/18164881/sony-tof-laser-depthsensing-3d-camera-report, 3 pages.

(56) References Cited

OTHER PUBLICATIONS

Jack Alexander, Next Generation of iPhones to 'Revolutionize' Photography, May Include Sony's 3D Technology and Advanced Facial Recognition, Dec. 29, 2018. Retrieved from the Internet: https://fstoppers.com/news/next-generation-iPhones-revolutionize-photography-may-include-sonys-3D-322630, 2 pages.

Peter Holley, This Patent Shows Amazon May Seek to Create a 'Database of Suspicious Persons' Using Facial-Recognition Technology, Dec. 18, 2018, Washingtonpost.com, Retrieved from the Internet: https://www.washingtonpost.com/technology/2018/12/13/this-patent-shows-amazon-may-seek-create-database-suspicious-persons-using-facial-recognition-technology/?utm_term=.476ede26a7f8, 3 pages.

Dave Brooks, Nathan Hubbard's Plan to 'Rival' Ticketmaster Makes Big Claims, But Offers Few Details, May 4, 2018, Retrieved from the Internet: https://www.billboard.com/articles/business/8454599/nathan-hubbard-ticketmaster-rival, 3 pages.

Zhang et al., "Image Based Localization in Urban Environments", 3D Data Processing, Visualization, and Transmission, Third International Symposium On, IEEE, PI, pp. 33-40 (2006).

Barr et al., "Face Recognition From Video: A Review", Draft 17 International Journal of Pattern Recognition and Artificial Intelligence, 2012, 56 pages., Retrieved from the Internet Nov. 19, 2013: URL:http://www3.nd.edu/-kwb/BarrEtAllJPRAI 2012.pdf.

James Vincent, "Facial Recognition Smart Glasses Could Make Public Surveillance Discreet and Ubiquitous," Updated Jun. 12, 2019. Retrieved from the Internet: URL: https://www.theverge.eom/2019/6/10/18659660/facial-recognition-smart-glasses-sunglasses-surveillance-vuzix-nntc-uae, 4 pages.

FotoTiger Facial Recognition Webpage, dated Nov. 18, 2018, retrieved online on Mar. 25, 2020, at https://thenextweb.com/apps/2014/11/18/fototiger-facial-recognition-app-android-puts-photos/, 4 pages.

* cited by examiner

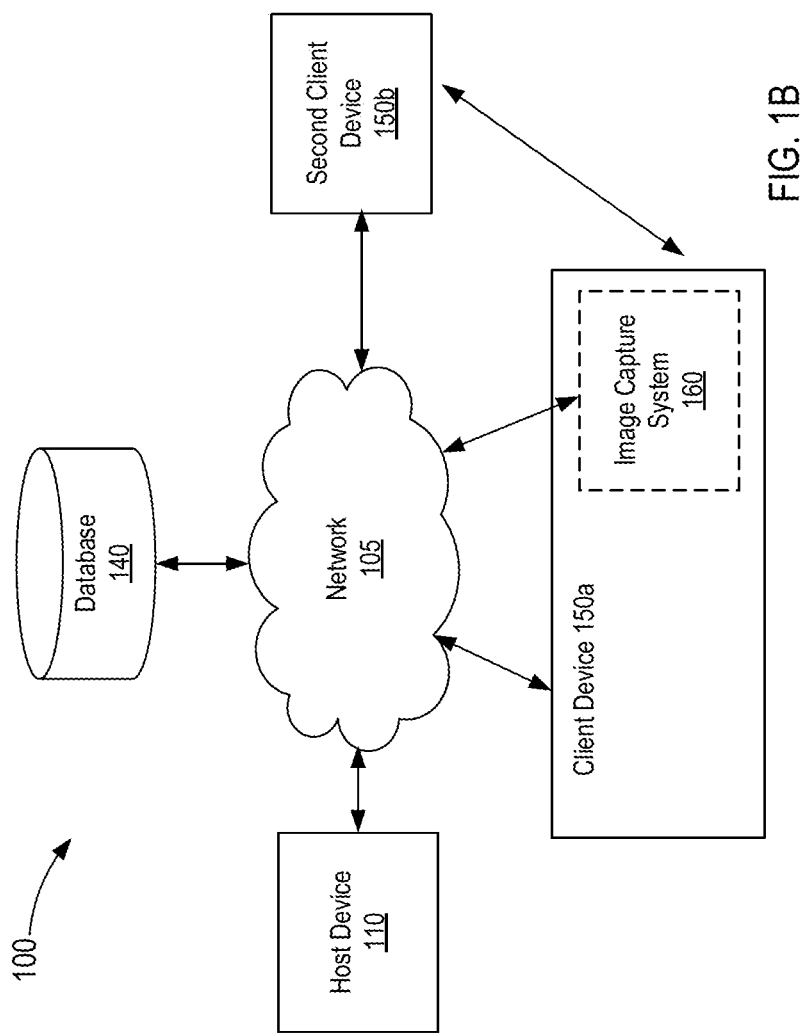

METHODS AND APPARATUS FOR FACIAL RECOGNITION ON A USER DEVICE

CROSS-REFERENCE TO RELATED APPLICATIONS

This application claims priority to and the benefit of U.S. Provisional Application No. 62/956,794, filed Jan. 3, 2020 and titled "Methods and Apparatus for Facial Recognition on a Client Device," which is incorporated herein by reference in its entirety.

BACKGROUND

The embodiments described herein relate generally to facial recognition and video analytics, and more particularly, to methods and apparatus for facial recognition on a client device.

Increases in the availability and capability of electronic devices such as cameras, tablets, smartphones, etc. have allowed some people to take pictures and/or capture video of their experiences. For example, the inclusion and improvement of cameras in smartphones, tablets, and/or other similar devices have led to increases in those devices being used to take pictures (e.g., photographic data, image data, etc.) and videos (e.g., video stream data). While, it has become easier for some people to take pictures and/or videos of their experiences, in some instances, there can still be challenges in including the desired parties (including the person who would otherwise be taking the picture or video). Moreover, a person generally has to remember and/or have the chance to take the picture and/or video, and failing to do can result in a lost opportunity.

In some instances, venues and/or events such as sporting events, concerts, rallies, graduations, and/or the like have cameras that can take pictures and/or video of those in attendance. In some instances, however, analyzing, parsing, and/or otherwise making the pictures and/or video stream available can use a relatively large amount of resources, can be inaccurate, and/or can fail to provide associated contextual data or the like. More specifically, in some instances, it can be difficult to verify that a particular person detected in a picture, was actually in the location captured in the picture, due to false positives obtained from using facial recognition alone to identify people in pictures.

SUMMARY

An apparatus includes a memory of a user device and a processor of the user device. The processor is configured to capture an image using an image capture device of the user devices and broadcast a request signal within a range of the user device. The request signal is a request for facial data from compute devices within the range. The processor is configured to receive, in response to the request signal, facial data from each compute device from a set of compute devices within the range and perform, using the facial data received from each compute device from the set of compute devices, facial recognition on the image to identify a match between the facial data from a subset of compute devices from the set of compute devices and facial data from the image. The processor is configured to transmit the image to the subset of compute devices.

BRIEF DESCRIPTION OF THE DRAWINGS

FIG. 1B is a schematic illustration of a recognition system according to another embodiment.

DETAILED DESCRIPTION

Figure 1A:
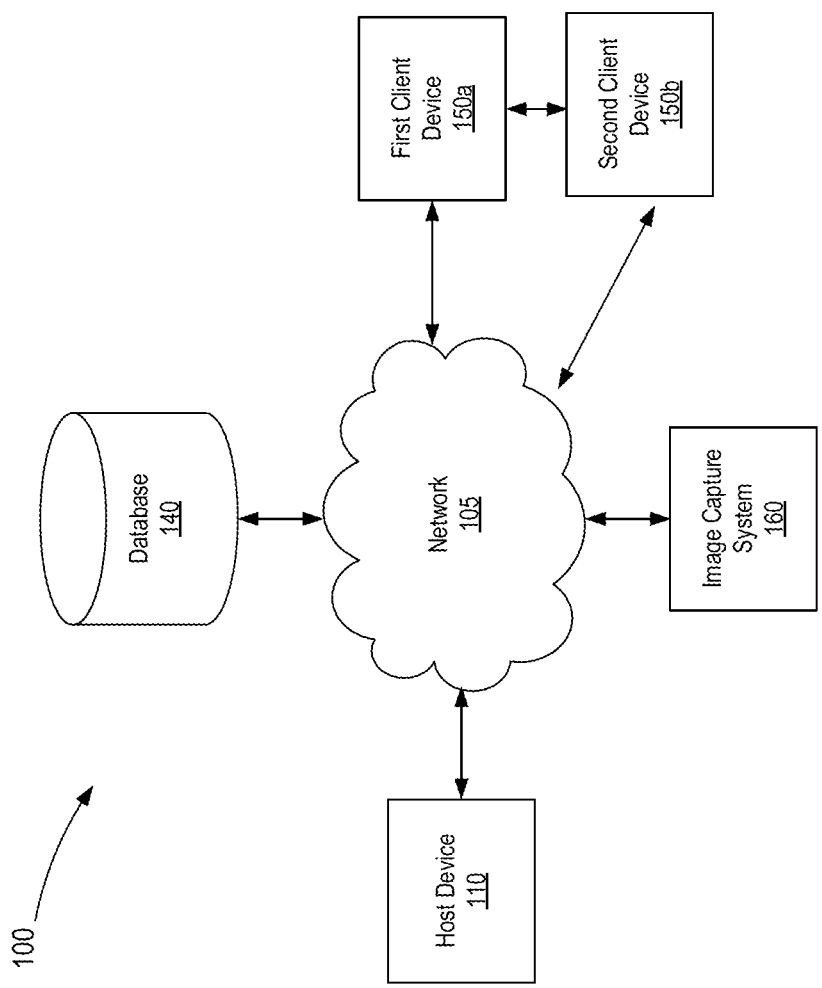
FIG. 1A is a schematic illustration of a recognition system according to an embodiment.

An apparatus includes a memory of a user device and a processor of the user device. The processor is configured to capture an image using an image capture device of the user devices and broadcast a request signal within a range of the user device. The request signal is a request for facial data from compute devices within the range. The processor is configured to receive, in response to the request signal, facial data from each compute device from a set of compute devices within the range and perform, using the facial data received from each compute device from the set of compute devices, facial recognition on the image to identify a match between the facial data from a subset of compute devices from the set of compute devices and facial data from the image. The processor is configured to transmit the image to the subset of compute devices.

In some embodiments, a method includes capturing an image using an image capture device of a user device and generating a request for facial data including an indication of a location of the user device. The method further includes sending the request for facial data to a server such that the server uses the indication of the location to identify a set of compute devices within a proximity of the location. Facial data associated with each compute device from the set of compute devices is received from the server. The method further includes performing, at the user device and using the facial data associated with each compute device from the set of compute devices, facial recognition on the image to identify a match between the facial data associated with a subset of compute devices from the set of compute devices and facial data from the image. The method includes providing the image to each compute device from the subset of compute devices.

In some embodiments, a non-transitory processor-readable medium stores code that represents instructions to be executed by a processor. The instructions include code to cause the processor to capture an image using an image capture device of a user device and send a request for facial data associated with a set of compute devices within a range of the user device. The instructions further include code to cause the processor to receive, in response to the request, facial data from at least one compute device from the set of compute devices and perform, at the user device and using the facial data received from the at least one compute device from the set of compute devices, facial recognition on the image to identify a match between the facial data from the at least one compute device from the set of compute devices and facial data from the image.

In some implementations, an apparatus includes an imaging device configured to generate image data representative of a field of view and a communication interface in communication with the imaging device and configured to communicate via a network. The apparatus also includes a processor in communication with the imaging device and the communication interface. In response to the imaging device generating the image data, the processor is configured to control the communication interface to broadcast a wireless signal covering at least a portion of the field of view, and the wireless signal includes at least a portion of first contextual data associated with the image data. The processor is also configured to control the communication interface to receive facial data (e.g., a facial recognition vector, a faceprint, facial recognition data, facial matching data, characteristics of a face, etc.) associated with the user of a user device and generated in response to the user device receiving the wireless signal. The processor is also configured to determine a potential presence of a user in the image data based on comparing the image data with the facial data and analyzing the image data based on at least one of two-dimensional facial recognition analytics, three-dimensional facial recognition analytics, or a convolutional neural network (CNN) to identify the user in the image data.

In some implementations, an apparatus can include a memory, a communication interface in communication with the memory and configured to communicate via a network, and a processor in communication with the memory and the communication interface. The processor is configured to receive image data via the network and the communication interface from an imaging device and first contextual data associated with the image data. The image data includes at least one image of a field of view. The processor is also configured to receive, via the network and the communication interface, second contextual data associated with a user of a user device. The second contextual data is generated in response to the user device receiving a wireless signal (1) sent, in response to the imaging device generating the image data, by an antenna operably coupled to the imaging device and (2) covering at least a portion of the field of view. The processor is further configured to determine a potential presence of the user in the image data based on comparing the first contextual data with the second contextual data, analyze the image data based on at least one of two-dimensional facial recognition analytics, three-dimensional facial recognition analytics, or a convolutional neural network (CNN) to identify the user in the image data, and send (or otherwise provide access to) the image data to the user.

The embodiments described herein relate to detecting and/or confirming the presence of a user or other individual in media based on facial data and contextual data associated with the media. In some embodiments, a method of image analysis includes receiving, at a host device (also referred to as a server) via a network, image data generated by a first user device (also referred to as a first client device) that includes an imaging device (e.g., configured for capturing an image of a field of view). The host device also receives first contextual data associated with the image data. In some implementations, the first contextual data is transmitted by the first user device as well. In some other implementations, the first contextual data is transmitted by another device operably coupled to the first user device (e.g., an antenna, a server, a communications interface, and/or any other suitable device).

The host device is also configured to receive, via the network, second contextual data associated with a user of a second user device (also referred to as a second client device). In some implementations, the second user device generates the second contextual data in response to receiving a wireless signal from the first user device, and the first user device generates the wireless signal in response to the imaging device generating the image data. The first user device is configured to broadcast the wireless signal such that the wireless signal covers at least a portion of the field of view. In other instances, the first user device does not send a wireless signal to the second user device and the second user device can send the second contextual data periodically, in response to a request from the host device, and/or based on any other event or timeframe.

The host device can then determine a potential presence of the user (i.e., associated with the second user device) in the image data based on comparing the first contextual data with the second contextual data. The host device also analyzes the image data based on at least one of two-dimensional facial recognition analytics, three-dimensional facial recognition analytics, or a convolutional neural network (CNN) to identify the user in the image data, and sends the image data to the user.

The comparison between the first contextual data and the second contextual data can be carried out in multiple implementations. In some implementations, the second user device generates the second contextual data spontaneously. In other words, the second user device generates the second contextual data without the involvement of the wireless signal from the first user device, and the first user device can be configured not to send out a wireless signal in response to generating the image data. For example, the second user device can send second location information (as part of the second contextual data) of the second user device to the host device, and the first contextual data includes first location information of the first user device. The first/second location information can include first/second geolocations of the first/second user. The host device can then compare the first location information with the second location information. If the two locations are within a predetermined value and/or range of each other (e.g., 1 meter, 2 meters, 5 meters, 10 meters, or any other suitable value), the host device can then determine that the user associated with the second user device is potentially present in the image data generated by the first user device. In these implementations, the second user device can send the second location information to the host device periodically, e.g., every 0.1 second, every 0.5 second, every 1 second, every 2 seconds, or at any other suitable frequencies.

The first contextual data can also include first timing information associated with the image data (e.g., timing point at which the image was taken), and the second contextual data can include second timing information representing the timing point at which the second contextual data was sent out. The host device can further compare this first timing information with the second timing information. If the two timing points are within a threshold value (e.g., 3 minutes, 2 minutes, 1 minute, 30 seconds, 15 seconds, or less, including any values and sub ranges in between), the host device can then determine that the second user is potentially present in the image data.

In some implementations, the second user device generates the second contextual data in response to receiving the wireless signal from the first user device. For example, in response to receiving the wireless signal from the first user device, the second user device sends the second contextual data including identification (ID) information associated with the user to the host device and a second timestamp. The second timestamp can be the time of receiving the wireless signal or the time of sending out the second contextual data. The first contextual data sent by the first user device includes a first timestamp representing the time of generating the image data. By comparing the two timestamps, the host device can determine whether the user is potentially present in the image data.

In another example, the first and second contextual data can include first and second location information representing the locations of the first user device and the second user device, respectively. By comparing the two location information, the host device can also determine the likelihood that the user is present in the image data.

In yet another example, the wireless signal sent by the first user device can include ID information associated with the image data and/or the first user device (e.g., a serial number). In response to receiving the wireless signal including the ID information, the second user device can forward at least part of the ID information to the host device. The first user device also sends the same ID information to the host device (e.g., contained in the first contextual data). The host device can then determine the likelihood of the user's presence in the image data based on whether the ID information in the second contextual data matches the ID information in the first contextual data.

In some implementations, both the first contextual data and the second contextual data can be sent to the host device by the second user device. For example, the wireless signal can include the first contextual data and the second user device then forwards this first contextual data (together with the second contextual data or as part of the second contextual data) to the host device. The first contextual data can include ID information associated with the first user device and/or the image data. The host device can then determine that the second user device is in proximity of the first user device based on the fact that ID information associated with the first user device and/or the image data is contained in data from the second user device.

The facial recognition (e.g., facial verification and/or facial matching) performed by the host device can be either before or after the comparison of the first contextual data with the second contextual data. In some implementations, the host device compares the first contextual data with the second contextual data to determine the potential presence of the user in the image data (e.g., if the user is close to the first client device). If the host device determines that the user is potentially present in the image data (e.g., based on a comparison of the first contextual data with the second contextual data), the host device then performs facial recognition on the image data to search this particular user and confirm the presence of this particular user if the facial recognition also returns a positive match. In some instances, if the host device determines that the user is not potentially present in the image data, the host device does not search for the user in the image data. In this manner, the host device can reduce the number of users to search for in a particular media file, and reduce false positives by tying the user's contextual data and the user's appearance to the data obtained from the media.

In some implementations, the host device can perform facial recognition to identify all possible users in the image data. The host device then compares the second contextual data with the first contextual data to determine the potential presence of the user associated with the second user device, after which the host device can determine whether this user associated with the second user device is within the possible users identified from facial recognition. If positive, the host device can then determine that the user is indeed present in the image data.

Once the host device determines that the user associated with the second user device is present in the image data, the host device can send the image data to the user. In some implementations, the image data includes one or more images where the user is present. In some implementations, the image data includes a video stream where the user is present in at least one frame of the video stream.

In some embodiments, the facial recognition can be performed by one or more client devices. In these embodiments, a client device (also referred to as a sending device) is configured to generate image data using an imaging device associated with the client device (e.g., a camera integrated with the client device). The client device is also configured to broadcast a wireless signal to other client devices (also referred to as receiving devices) requesting facial data (e.g., a facial recognition vector, a faceprint, facial recognition data, facial characteristic data, etc.). The wireless signal is configured to cause at least some of the receiving devices to send facial data to the sending device. Upon receiving the facial data, the sending device is configured to perform facial recognition to identify one or more persons in the image data.

In some embodiments, the sending device is configured to generate a request signal and send the request signal to a server that is configured to store facial data of users associated with client devices. The server, upon receiving the request signal, is configured to retrieve facial data associated with potential candidates that might be present in the image data generated by the sending device. The server is also configured to send the retrieved facial data to the sending device, which then performs facial recognition (e.g., facial verification and/or facial matching) based on the received facial data. In some embodiments, the server is configured to identify the potential candidates based on contextual data (e.g., location of the sending device, timing of the image data, etc.).

In some embodiments, the sending device is configured to generate a request signal that includes at least a portion of the image data. The request signal is configured to cause at least some receiving devices to perform facial recognition (e.g., facial verification and/or facial matching). Each receiving device is configured to generate a response signal and send the response signal to the sending device. For example, the response signal can include information about whether any person is identified using the facial recognition performed by that receiving device. The sending device is configured to confirm the presence of one or more candidate persons in the image data. More details about facial recognition at the client device are provided below with reference to, e.g., FIGS. 7-10.

As used in this specification, the singular forms "a," "an" and "the" include plural referents unless the context clearly dictates otherwise. Thus, for example, the term "a module" is intended to mean a single module or a combination of modules, "a network" is intended to mean one or more networks, or a combination thereof.

As used herein the term "module" refers to any assembly and/or set of operatively-coupled electrical components that can include, for example, a memory, a processor, electrical traces, optical connectors, software (executing in hardware), and/or the like. For example, a module executed in the processor can be any combination of hardware-based module (e.g., a field-programmable gate array (FPGA), an application specific integrated circuit (ASIC), a digital signal processor (DSP)) and/or software-based module (e.g., a module of computer code stored in memory and/or executed at the processor) capable of performing one or more specific functions associated with that module.

The embodiments and methods described herein can use facial data to (1) search for one or more images of a registered user (e.g., a person who's facial data is predetermined) and (2) provide the images (or a video stream including the images) to a client device associated with the user (e.g., a smartphone, tablet, computer, wearable electronic device, etc.). Facial recognition (e.g., facial verification and/or facial matching) generally involves analyzing one or more images of a person's face to determine, for example, salient features of his or her facial structure (e.g., cheekbones, chin, ears, eyes, jaw, nose, hairline, etc.) and then defining a qualitative and/or quantitative data set associated with and/or otherwise representing the salient features. One approach, for example, includes extracting data associated with salient features of a person's face and defining a data set including geometric and/or coordinate based information (e.g., a three dimensional (3-D) analysis of facial data). Another approach, for example, includes distilling image data into qualitative values and comparing those values to templates or the like (e.g., a two dimensional (2-D) analysis of facial data). In some instances, another approach can include any suitable combination of 3-D analytics and 2-D analytics.

Some facial recognition methods and/or algorithms include Principal Component Analysis using Eigenfaces (e.g., Eigenvector associated with facial recognition), Linear Discriminate Analysis, Elastic Bunch Graph Matching using the Fisherface algorithm, Hidden Markov model, Multilinear Subspace Learning using tensor representation, neuronal motivated dynamic link matching, convolutional neural nets (CNN), and/or the like or combination thereof. Any of the embodiments and/or methods described herein can use and/or implement any suitable facial recognition method and/or algorithm or combination thereof such as those described above.

In some embodiments, facial recognition (e.g., facial verification and/or facial matching) is performed to identify a match between an individual in two images (e.g., a reference image and a second image) without identifying an identity of an individual (or other personal information about the individual) in the images. For example, by performing facial recognition (e.g., facial verification and/or facial matching), a match between an individual in two images can be identified without knowing and/or identifying personally identifiable information about the individual. In some embodiments, facial recognition can be used to identify a subset of information about the individual (e.g., a distribution method such as a phone number or email address, a profile including user-provided information, and/or the like). In some embodiments, facial recognition (e.g., facial verification and/or facial matching) can be between facial data associated with an individual (e.g., a faceprint of the individual, data associated with facial characteristics of the individual, etc.) and an image potentially including the individual, as described in further detail herein (whether or not additional data about the individual and/or an identity of the individual is identified).

FIG. 1A is a schematic illustration of a recognition system 100 (e.g., image recognition and/or video recognition) according to an embodiment. In some instances, the recognition system 100 (also referred to herein as "system") can be used to present an image or a video stream of a user based at least in part on facial data (e.g., a facial recognition vector, a faceprint, facial recognition data, facial matching data, facial characteristic data, etc.). At least a portion of the system 100 can be, for example, represented and/or described by a set of instructions or code stored in a memory and executed in a processor of an electronic device and/or compute device (e.g., a host device, a server or group of servers, a personal computer (PC), a network device, a mobile device, a user device, a client device, etc.) and/or the like. For example, in some embodiments, a host device can receive a signal associated with a request to register facial data associated with a user and in response, can store the facial data in a database. Similarly, the host device can receive a signal associated with image data (including video stream data). In some instances, one or more processors of the host device can then execute a set of instructions or code, stored in a memory of the host device, associated with analyzing the image data to determine if one or more images of the user are present in the image data based at least in part on the facial data and/or contextual information (e.g., location). If images are found in the image data, the one or more processors can isolate an associated portion of the image data. Moreover, the one or more processors can execute a set of instructions or code to (1) associate contextual data (e.g., time, location, event, etc.) with the image data and (2) define a contextual image of the user. The one or more processors can then send, to the client device associated with the user, a signal indicative of an instruction to present the contextual image of the user on a display of the client device (e.g., by graphically rendering the contextual image in an interface instantiated on the client device). The image can be a contextual image based on contextual data (1) being associated with the image and/or (2) being used to aid in identifying the user in the image.

The system 100 includes a host device 110 in communication with a database 140, a first client device 150a and a second client device 150b (collectively referred to as client devices 150, also referred to as user devices 150), and an image capture system 160. The host device 110 can be any suitable host device and/or compute device such as a server or group of servers, a network management device, a personal computer (PC), a processing unit, and/or the like in electronic communication with the database 140, the client devices 150, and the image capture system 160. For example, in this embodiment, the host device 110 can be a server or group of servers (disposed in substantially the same location and/or facility or distributed in more than one location) in electronic communication with the database 140, the client devices 150, and the image capture system 160 via a network 105, as described in further detail herein.

Each client device 150 can be any suitable compute device such as a PC, a laptop, a convertible laptop, a tablet, a personal digital assistant (PDA), a smartphone, a wearable electronic device (e.g., a smart watch, etc.), a mobile device, a user device, and/or the like. In some embodiments, the client devices 150 include consumer electronics. In some embodiments, the client devices 150 can include any other electronic device that includes at least a memory, a processor, a communication interface, a display, and one or more inputs (see, e.g., FIG. 3 below). For example, the client device 150a/b can include a stadium camera in communication with a computing device located away from the stadium camera. The memory, the processor, the communication interface, the display, and the input(s) can be connected and/or electrically coupled to each other such as to allow signals to be sent therebetween. For example, in some embodiments, the memory can be a random access memory (RAM), a memory buffer, a hard drive, a read-only memory (ROM), an erasable programmable read-only memory (EPROM), and/or the like. The processor can be any suitable processing device configured to run or execute a set of instructions or code (e.g., stored in the memory) such as a general-purpose processor (GPP), a central processing unit (CPU), an accelerated processing unit (APU), a graphics processor unit (GPU), an Application Specific Integrated Circuit (ASIC), and/or the like. Such a processor can run or execute a set of instructions or code stored in the memory associated with using a PC application, a mobile application, an internet web browser, a cellular and/or wireless communication (via a network), and/or the like. More specifically, the processor can execute a set of instructions or code stored in the memory associated with sending facial data to and/or receiving facial data and/or contextual video stream data from the host device 110, as described in further detail herein.

The communication interface of the client devices 150 can be any suitable module and/or device that can place the resource in communication with the host device 110 such as one or more network interface cards or the like. Such a network interface card can include, for example, an Ethernet port, a WiFi® radio, a Bluetooth® radio (e.g., a Bluetooth® antenna), a near field communication (NFC) radio, and/or a cellular radio that can place the client devices 150 in communication with the host device 110 via a network (e.g., the network 105) or the like. As such, the communication interface can send signals to and/or receive signals from the processor associated with electronically communicating with the host device 110 via the network 105. In addition, the communication interface of the client devices 150 can also send and/or receive signals to/from each other, i.e. the first client device 150a is in communication with the second client device 150b. In some instances, the communication interface of the client devices 150 can include multiple communication interfaces (e.g., a WiFi® communication interface to communicate with the host device 110 and a Bluetooth® communication interface to send and/or broadcast signals to other client devices 150).

The display of the client devices 150 can be, for example, a cathode ray tube (CRT) monitor, a liquid crystal display (LCD) monitor, a light emitting diode (LED) monitor, and/or the like that can graphically represent any suitable portion of the system 100 (e.g., a graphical user interface (GUI) associated with a webpage, PC application, mobile application, and/or the like). In some embodiments, such a display can be and/or can include a touch screen configured to receive a haptic user input. In some instances, the display can be configured to graphically represent data associated with a facial recognition process and/or data associated with an image and/or a video stream, as described in further detail herein.

The input(s) of the client devices 150 can be any suitable module and/or device that can receive one or more inputs (e.g., user inputs) and that can send signals to and/or receive signals from the processor associated with the one or more inputs. In some embodiments, the input(s) can be and/or can include ports, plugs, and/or other interfaces configured to be placed in electronic communication with a device. For example, such an input can be a universal serial bus (USB) port, an Institute of Electrical and Electronics Engineers (IEEE) 1394 (FireWire) port, a Thunderbolt port, a Lightning port, and/or the like. In some embodiments, the display can be included in a touch screen or the like configured to receive a haptic user input.

In some embodiments, an input can be a camera and/or other imaging device. For example, in some embodiments, such a camera can be integrated into the client devices 150 (e.g., as in smartphones, tablets, laptops, etc.) and/or can be in communication with the client devices 150 via a port or the like (e.g., such as those described above). The camera can be any suitable imaging device such as, for example, a webcam or a forward facing camera included in a smartphone or tablet (e.g., a camera pointed substantially in the same direction as the display). In this manner, the user can manipulate the client devices 150 to cause the camera to capture an image (e.g., a photo) or a video. Moreover, in some instances, the display can be configured to graphically render data associated with an image and/or video captured by the camera. By way of example, in some embodiments, the client devices 150 can be a smartphone, tablet, or wearable electronic device that includes a forward facing camera. In some instances, a user can manipulate the client devices 150 to take a picture or video of himself or herself via the camera (e.g., also known as a "selfie").

In some instances, a camera (e.g., an input) included in the client devices 150 can be used to capture an image of a user's face, which in turn, can be used to register facial data associated with the user. Specifically, the user can manipulate the client device 150a/b such that the camera captures an image of the user's face. In some instances, the display can be configured to graphically render an indication, frame, boundary, guide, and/or any other suitable graphical representation of data, which can provide an indication to a user associated with a desired alignment for the image of the user's face. Once the camera captures the desired image, the processor can receive and/or retrieve data associated with the image of the user's face and, in turn, can execute a set of instructions or code (e.g., stored in the memory) associated with at least a portion of a facial recognition process. For example, in some instances, the processor can execute a set of instructions or code associated with verifying an alignment between the indication, frame, boundary, etc. graphically rendered on the display and the captured image of the user's face. In some instances, the client device 150a/b can be configured to send, via the network 105, a signal associated with data representing the image of the user to the host device 110 when the alignment is verified, and in response, the host device 110 can perform any suitable facial recognition process or processes on the data, as described in further detail herein.

The image capture system 160 can be and/or can include any suitable device or devices configured to capture image data. For example, the image capture system 160 can be and/or can include one or more cameras and/or image recording devices configured to capture an image (e.g., a photo) and/or record a video stream. In some embodiments, the image capture system 160 can include multiple cameras in communication with a central computing device such as a server, a personal computer, a data storage device (e.g., a network attached storage (NAS) device, a database, etc.), and/or the like. In such embodiments, the cameras can be autonomous (e.g., can capture image data without user prompting and/or input), and can each send image data to the central computing device (e.g., via a wired or wireless connection, a port, a serial bus, a network, and/or the like), which in turn, can store the image data in a memory and/or other data storage device. Moreover, the central computing device can be in communication with the host device 110 (e.g., via the network 105) and can be configured to send at least a portion of the image data to the host device 110. Although shown in FIG. 1A as being in communication with the host device 110 via the network 105, in other embodiments, such a central computing device can be included in, a part of, and/or otherwise coupled to the host device 110. In still other embodiments, the cameras can be in communication with the host device 110 (e.g., via the network 105) without such a central computing device.

In some embodiments, the image capture system 160 can be associated with and/or owned by a venue or the like such as, for example, a sports arena, a theme park, a theater, and/or any other suitable venue. In other embodiments, the image capture system 160 can be used in or at a venue but owned by a different entity (e.g., an entity licensed and/or otherwise authorized to use the image capture system 160 in or at the venue such as, for example, a television camera at a sporting event). In still other embodiments, the image capture system 160 can include any number of client devices (e.g., user devices) or the like such as smartphones, tablets, etc., which can be used as cameras or recorders. In such embodiments, at least some of the client devices can be in communication with the host device 110 and/or a central computing device associated with the venue (e.g., as described above).

For example, in some embodiments, the camera integrated into the first client device 150a can form and/or be part of at least a portion of the image capture system 160, as shown in FIG. 1B. In this manner, the first user of the first client device 150a can manipulate the first client device 150a to capture a picture and/or video recording and in response, the first client device 150a can upload and/or otherwise send the picture (e.g., image data, photographic data, etc.) and/or video recording data to the host device 110. In some instances, the picture and/or video recording data can be stored on the first client device 150a for any suitable time and uploaded and/or sent to the host device 110 at a later time. Moreover, the picture and/or video recording data can be stored on the first client device 150a after the picture and/or video recording data is sent to the host device 110. That is to say, sending the picture and/or video recording data does not delete and/or remove the picture and/or video recording data from the first client device 150a (e.g., a copy of the data is sent to the host device 110). Thus, as shown in FIG. 1B, the image capture system 160 need not be associated with a particular event and/or venue. In such instances, the first user can manipulate the first client device 150a (e.g., an application of the first client device 150a) to capture user generated content (e.g., pictures, image data, photographic data, video stream data, etc.) via the camera and/or recording device (e.g., the image capture system 160) integrated into the first client device 150a.

In some instances, the image capture system 160 is configured to capture image data associated with a venue and/or event. In other words, the image capture system 160 is configured to capture image data within a predetermined, known, and/or given context. For example, in some instances, the image capture system 160 can include one or more image capture devices (e.g., cameras and/or video recorders) that are installed at an arena or the like and that are configured to capture image data associated with patrons, guests, performers, etc. at the arena. In this manner, the image capture system 160 is configured to capture image data within the context of the arena and/or an event occurring at the arena. Thus, the captured image data can be, for example, "contextual image data." That is to say, the image data is associated with at least some contextual data. As a non-limiting example, the host device 110 can receive the image data and/or video stream data from the image capture system 160 and data associated with the context (e.g., "contextual data" associated with the arena and/or the event occurring at the arena, and/or any other suitable contextual and/or metadata) from any suitable data source and/or the like; can associate the contextual data with, for example, the image data; can define a user-specific contextual image and/or user-specific contextual video stream associated with, for example, a user of the client device 150a/b; and can send the user-specific contextual image and/or user-specific contextual video stream associated with the user to the client device 150a/b. Alternatively and/or additionally, the host device 110 can also receive contextual data from one or more of the user devices 150 as described herein.

As described above, the client devices 150 and the image capture system 160 can be in communication with the host device 110 via one or more networks. For example, as shown in FIG. 1A, the client devices 150 and the image capture system 160 can be in communication with the host device 110 via its communication interface and the network 105. The network 105 can be any type of network such as, for example, a local area network (LAN), a virtual network such as a virtual local area network (VLAN), a wide area network (WAN), a metropolitan area network (MAN), a worldwide interoperability for microwave access network (WiMAX), a cellular network, the Internet, and/or any other suitable network implemented as a wired and/or wireless network. By way of example, the network 105 can be implemented as a wireless local area network (WLAN) based on the Institute of Electrical and Electronics Engineers (IEEE) 802.11 standards (also known as "WiFi®"). Moreover, the network 105 can include a combination of networks of any type such as, for example, a LAN or WLAN and the Internet. In some embodiments, the client devices 150 can communicate with the host device 110 and the network 105 via intermediate networks and/or alternate networks (not shown), which can be a similar to or different from the network 105. As such, the client devices 150 can send data to and/or receive data from the host device 110 using multiple communication modes (e.g., associated with any of the networks described above) that may or may not be transmitted to the host device 110 using a common network. For example, the client devices 150 can be mobile telephones (e.g., smartphones) connected to the host device 110 via a cellular network and the Internet (e.g., the network 105).

In some instances, the network can facilitate, for example, a peer networking session or the like. In such instances, the peer networking session can include, for example, client devices and/or any other suitable electronic device, each of which share a common characteristic. For example, in some instances, the peer networking session can include any suitable client device (e.g., an electronic device registered in the database 140 and/or the like) that is within a predetermined proximity of a venue, event, location, etc. For example, in some instances, such a peer networking session can include any number of registered client devices present at a venue (e.g., a sports event). In some instances, the peer networking session can be automatically established based on contextual data associated with the user and/or the client device. In other instances, the peer networking session can be automatically established based on one or more users "checking-in" and/or otherwise publicizing his or her presence at the venue or the like (e.g., "squawk" the user's presence). In some instances, a user can "check-in" at a time the user arrived at an event or the like (e.g., sports event, concert, wedding, birthday party, gathering, etc.), at a time of registration, at a time of capturing an image or video stream, and/or the like. Further, the "check-in" can include identifying information such as, for example, geo-location data, date and time data, personal or user identification data, etc. In some implementations, a user can also, via an application on their client devices 150, search for events and/or locations for which video stream data has been captured. The user can "check-in" to the event and/or locations that are returned from the search. As described herein, checking into an event and/or location can initiate processing of the video stream data associated with that event and/or location, e.g., to determine whether or not the user can be matched to the image or video stream data.

In other instances, a user can manually establish a peer networking session including, for example, a predetermined set or group of users. In some instances, such peer networking sessions can be public networks, private networks, and/or otherwise limited access networks. For example, in some instances, a user can request to join a networking session and/or can receive an invite to join a networking session and/or the like. In some instances, establishing a peer networking session can, for example, facilitate communication (e.g., group chat sessions or the like) and/or sharing of image and/or video data between users included in the peer networking session.

The host device 110 can be any suitable compute device configured to send data to and/or receive data from the database 140, the client devices 150, and/or the image capture system 160. In some implementations, the host device 110 can function as, for example, a server device (e.g., a web server device), a network management device, an administrator device, and/or so forth. In some embodiments, the host device 110 can be a group of servers or devices housed together in or on the same blade, rack, and/or facility or distributed in or on multiple blades, racks, and/or facilities. The host device 110 includes at least a memory 115, a processor 120, and a communication interface 125 (see e.g., FIG. 2). In some embodiments, the memory 115, the processor 120, and the communication interface 125 are connected and/or electrically coupled so that signals can be sent between the memory 115, the processor 120, and the communication interface 125. The host device 110 can also include and/or can otherwise be operably coupled to the database 140 configured to store user data, facial data, contextual data (e.g., associated with a time, location, venue, event, etc.), video streams, and/or the like.

The memory 115 can be, for example, RAM, a memory buffer, a hard drive, a database, a ROM, an EPROM, an EEPROM, and/or so forth. In some instances, the memory 115 of the host device 110 includes a set of instructions or code used to perform one or more facial recognition actions and/or used to communicate (e.g., send and/or receive) data with at least one device (e.g., the client devices 150) using one or more suitable communication modes.

The processor 120 can be any suitable processor such as, for example, a GPP, a CPU, an APU, a GPU, a network processor, a front-end processor, an ASIC, an FPGA, and/or the like. Thus, the processor 120 can be configured to perform and/or execute a set of instructions, processes, modules, and/or code stored in the memory 115. For example, the processor 120 can be configured to execute a set of instructions, processes and/or modules associated with, inter alia, receiving facial data (e.g., from the client devices 150), analyzing the facial data, registering and/or storing the facial data, receiving video stream data (e.g., from the image capture system 160), analyzing the video stream data and comparing the video stream data to the facial data, receiving and comparing contextual data, sending video stream data (e.g., to the client device 150a/b), receiving and/or analyzing characteristics of the video stream data (e.g., location information determined based on such as background landmark and/or background scenery data included in the video stream data, and/or the like), and/or any other suitable process, as further described herein.

The communication interface 125 can be any suitable device that can place the host device 110 in communication with the database 140, the client devices 150, the image capture device 160 and/or any other suitable device and/or service in communication with the network 105 (e.g., any device configured to gather and/or at least temporarily store data such as facial data, video streams, and/or the like). In some embodiments, the communication interface 125 can include one or more wired and/or wireless interfaces, such as, for example, network interface cards (NIC), Ethernet interfaces, optical carrier (OC) interfaces, asynchronous transfer mode (ATM) interfaces, and/or wireless interfaces (e.g., a WiFi® radio, a Bluetooth® radio, an NFC radio, and/or the like).

Returning to FIG. 1A, the database 140 associated with the host device 110 can be any suitable database such as, for example, a relational database, an object database, an object-relational database, a hierarchical database, a network database, an entity-relationship database, a structured query language (SQL) database, an extensible markup language (XML) database, digital repository, a media library, a cloud server or storage, and/or the like. In some embodiments, the host device 110 can be in communication with the database 140 over any suitable network (e.g., the network 105) via the communication interface 125. In such embodiments, the database 140 can be included in or stored by a network attached storage (NAS) device that can communicate with the host device 110 over the network 105 and/or any other network(s). In other embodiments, the database can be stored in the memory 115 of the host device 110. In still other embodiments, the database can be operably coupled to the host device 110 via a cable, a bus, a server rack, and/or the like.

The database 140 can store and/or at least temporarily retain data associated with the recognition system 100. For example, in some instances, the database 140 can store data associated with and/or otherwise representing user profiles, resource lists, facial data, modes, and/or methods, contextual data (e.g., associated with a time, location, venue, event, etc.), video streams or portions thereof, images, location information (such as landmark data), and/or the like. In other words, the database 140 can store data associated with users whose facial image data has be registered by the system 100 (e.g., "registered users"). In some embodiments, the database 140 can be and/or can include a relational database, in which data can be stored, for example, in tables, matrices, vectors, etc. according to the relational model. By way of example, in some instances, the host device 110 can be configured to store in the database 140 image data and/or video stream data received from a video or image source (e.g., the image capture system 160) and contextual data associated with the video stream data. In some instances, the image data and/or the video stream data and the contextual data associated therewith can collectively define a contextual video stream or the like, as described in further detail herein. In other instances, the video stream data can be stored in the database 140 without contextual data or the like. In some instances, the contextual data can be used to reduce false positives associated with the facial recognition process, as described herein.

In some implementations, the user profiles can be user profile data structures that include information relating to users accessing image data. For example, a user profile data structure can include a user profile identifier, facial data (e.g., data obtained from an image of the user (e.g., facial characteristic data) that can be used to match the user to an image from the image data), a list of identifiers associated with image data structures stored in the database 140 and associated with the user, a list of identifiers associated with the user profile data structures of other users with which the user is associated (e.g., as a friend and/or contact), user location data, and/or the like.

In some implementations, users can add each other as friends within an application through which they access image data. Users can also be automatically be associated with each other, e.g., when a user associated with a first user profile is a contact of another user associated with a second user profile. For example, a user operating a client device can have a list of contacts, and/or other contact information, stored at the client device. The application can retrieve and import the contact information, can match the contact information to information in at least one user profile in the database, and can automatically associate that at least one user profile with that user.

In some implementations, the users can be associated with each other by storing a list of friends and/or contacts (e.g., a list of identifiers of user profiles to be added as friends of a particular user) within each user profile of each user. When a user adds a friend and/or contact, the user can automatically be notified when the friend and/or contact records and/or receives image data, video stream data, and/or the like. In some implementations, the host device 110 can also use the stored relationships between users to automatically process image data and/or video stream data associated with the user (e.g., to determine whether friends and/or contacts of the user can be found within the image data and/or video stream data). For example, when the image data is received, when a friend and/or contact is associated with the user, and/or the like, the host device 110 can automatically process the image data to determine whether facial image data associated with the friends and/or contacts of the user can be matched to the image data.

Although the host device 110 is shown and described with reference to FIG. 1 as including and/or otherwise being operably coupled to the database 140 (e.g., a single database), in some embodiments, the host device 110 can be operably coupled to any number of databases. Such databases can be configured to store at least a portion of a data set associated with the system 100. For example, in some embodiments, the host device 110 can be operably coupled to and/or otherwise in communication with a first database configured to receive and at least temporarily store user data, user profiles, and/or the like and a second database configured to receive and at least temporarily store image data and/or video stream data and contextual data associated with the image data and/or video stream data. In some embodiments, the host device 110 can be operably coupled to and/or otherwise in communication with a database that is stored in or on the client device 150 and/or the image capture system 160. Similarly stated, at least a portion of a database can be implemented in and/or stored by the client devices 150 and/or the image capture system 160. In this manner, the host device 110 and, in some instances, the database 140 can be in communication with any number of databases that can be physically disposed in a different location than the host device 110, while being in communication with the host device 110 (e.g., via the network 105).

In some embodiments, the database 140 can be a searchable database and/or repository. For example, in some instances, the database 140 can store image data and/or video stream data associated with a user (e.g., contextual video stream data). In some instances, the user can search the database 140 to retrieve and/or view one or more images and/or video streams associated with the user that are stored in the database 140. In some instances, the user can have a limited access and/or privileges to update, edit, delete, and/or add images and/or video streams associated with his or her user profile (e.g., user-specific contextual video streams and/or the like). In some instances, the user can, for example, update and/or modify permissions and/or access associated with the user-specific images and/or video streams associated with that user. For example, in some instances, the user can redistribute, share, and/or save data associated with the user. In other instances, the user can block access to user-specific data and/or the like. In some instances, the user can redistribute and/or share content, data, images, and/or video streams otherwise shared with the user (e.g., that may or may not be associated with the user).

Figure 2:
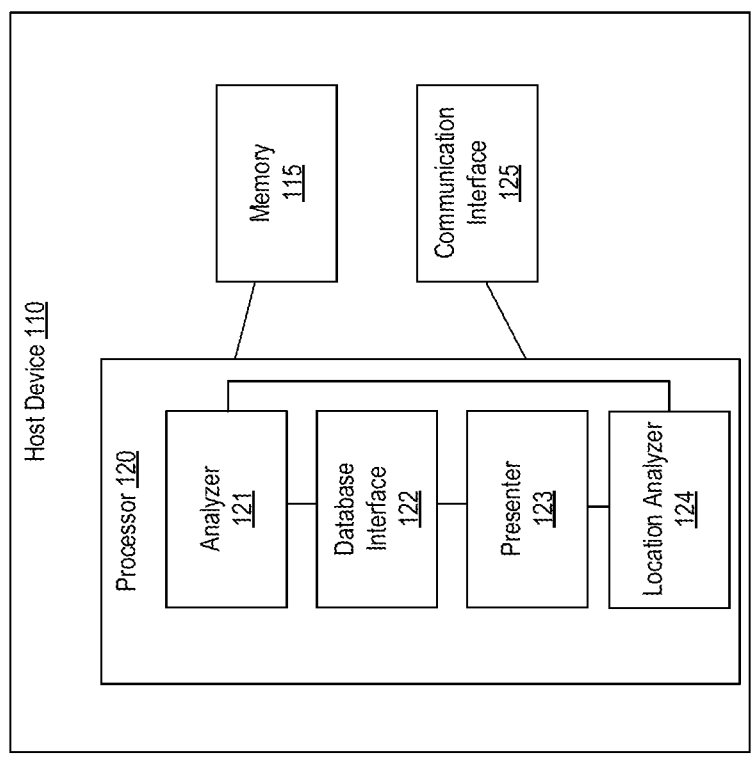
FIG. 2 is a schematic illustration of a host device included in the recognition system of FIGS. 1A and 1B.

Returning to FIG. 2, as described above, the processor 120 of the host device 110 can be configured to execute specific functions or instructions. The functions can be implemented in, for example, hardware, software stored in the memory 115 and/or executed in the processor 120, and/or any combination thereof. For example, as shown in FIG. 2, the processor 120 includes an analyzer 121 (e.g., to execute analysis functions), a database interface 122 (e.g., to execute database functions), a presenter 123 (e.g., to execute presentation functions), and a location analyzer 124 (e.g., to execute location functions). As shown in FIG. 2, the analyzer 121, the database interface 122, the presenter 123, and the location module can be connected and/or electrically coupled. As such, signals can be sent between the analyzer 121, the database interface 122, the presenter 123, and the location analyzer 124.

The analyzer 121 includes a set of instructions that can be executed by the processor 120 (or portion thereof) that are associated with receiving and/or collecting data associated with a facial recognition of a user, an image and/or a video stream. More particularly, the analyzer 121 can be operably coupled to and/or otherwise in communication with the communication interface 125 and can receive data therefrom. Such data can be, for example, associated with a user (e.g., facial recognition information, profile information, preferences, activity logs, location information, contact information, calendar information, social media activity information, etc.), a venue (e.g., location data, resource data, event schedule), an event, and/or the like. As described in further detail herein, the analyzer 121 can receive a signal from the communication interface 125 associated with a request and/or an instruction to perform and/or execute any number of processes associated with facial recognition.

In some instances, the analyzer 121 can receive data from the communication interface 125 in substantially real-time. That is to say, in some instances, an electronic device included in the system 100 (e.g., the client device 150) can be manipulated by a user to define and/or update data associated with facial recognition of the user and once defined and/or updated can send the data to the host device 110 via the network 105. Thus, the communication interface 125 can, upon receiving the data, send a signal to the analyzer 121, which receives the data in a very short time period after being defined and/or updated by the electronic device. In other embodiments, the analyzer 121 can receive data from the communication interface 125 at a predetermined rate or the like based on, for example, an aggregation process, a current and/or predicted processor, memory, and/or network load, and/or the like.

As described above, the analyzer 121 can be configured to receive, aggregate, analyze, sort, parse, alter, and/or update data associated with a facial recognition process or the like. More particularly, in some instances, a user can manipulate the client device 150a/b to capture one or more images or video streams of his or her face (as described in further detail herein) and, in turn, can send signals associated with and/or representing the image data to the host device 110, for example, via the network 105. In some instances, the communication interface 125 can receive the image data and can send an associated signal to the analyzer 121. Upon receipt, the analyzer 121 can execute a set of instructions or code (e.g., stored in the analyzer 121 and/or in the memory 115) associated with aggregating, analyzing, sorting, updating, parsing, and/or otherwise processing the image data. More specifically, the analyzer 121 can perform any suitable facial recognition process and/or algorithm such as, for example, Principal Component Analysis using Eigenfaces (e.g., Eigenvector associated with facial recognition), Linear Discriminate Analysis, Elastic Bunch Graph Matching using the Fisherface algorithm, Hidden Markov model, Multilinear Subspace Learning using tensor representation, neuronal motivated dynamic link matching, convolutional neural nets (CNN), and/or the like or combination thereof. In some implementations, image data the user provides to the host device 110 can be used in subsequent facial recognition processes to identify the user, via the analysis section 121.

The analyzer 121 can define a user profile or the like that includes the user's image data, and any other suitable information or data associated with the user such as, for example, a picture, video recording and/or audio recording, personal and/or identifying information (e.g., name, age, sex, birthday, hobbies, etc.), calendar information, contact information (e.g., associated with the user and/or the user's friends, family, associates, etc.), device information (e.g., a media access control (MAC) address, Internet Protocol (IP) address, etc.), location information (e.g., current location data and/or historical location data), social media information (e.g., profile information, user name, password, friends or contacts lists, etc.), and/or any other suitable information or data. As such, the analyzer 121 can send a signal to the database interface 122 indicative of an instruction to store the user profile data in the database 140, as described in further detail herein.

In some instances, the analyzer 121 can receive video stream data (or image data, for example, from a photograph) and can be configured to analyze and/or process the image data and/or the video stream data to determine if a portion of the image data and/or the video stream data matches any suitable portion of users' image data. That is to say, the analyzer 121 can use previously-stored user image data as a template against which data included in the image and/or video stream is compared. Said another way, the analyzer 121 performs a facial recognition process and/or analysis on the image data and/or the video stream data based at least in part on the previously-stored user image data. In some embodiments, the host device 110 and more particularly, the communication interface 125 receives the image data and/or the video stream data from the image capture system 160 either directly (e.g., from one or more cameras via the network 105) or indirectly (e.g., from a computing device via the network 105, which in turn, is in communication with the one or more cameras). In some embodiments, the analyzer 121 can be configured to analyze and/or process the video stream data based at least in part on separating, parsing, sorting, and/or otherwise deconstructing the video stream data into its individual frames (e.g., a static image at a predetermined time during the video stream). As such, the analyzer 121 can compare and/or analyze data included in the video stream frame relative to the previously-stored user image data.

In some instances, the analyzer 121 can also analyze the image data and/or the video stream data to determine contextual information associated with the image data and/or the video stream such as, for example, location, venue, time, coinciding event (e.g., a sports team scoring a goal, being captured, for example, on a "kiss cam," etc.), and/or any other suitable contextual information. In some instances, the analyzer 121 can be configured to match, aggregate, and/or otherwise associate at least a portion of the image data and/or the video stream to the contextual data. For example, in some instances, the image data and/or the video stream data can represent, for example, a user at a sporting event. In such instances, the contextual data can be, for example, a video stream of the sporting event or game, and can include data associated with a time, location, venue, teams, etc. As such, the analysis section 121 can be configured to aggregate the image data and/or the video stream data and the contextual data such that the video stream data and the contextual data substantially coincide (e.g., occur and/or capture data associated with substantially the same time). In other instances, the contextual data can include data associated with any other suitable context. In some instances, the analyzer 121 can be configured to use the contextual information associated with the image data and/or the video stream, along with data relating to the location of a user, to further connect the image data and/or the video stream to a particular user. The analyzer 121 can be configured to compare the contextual information to a user's location prior to comparing data included in the video stream to the previously-stored user image data.

If the analyzer 121 determines that at least a portion of the data in the image data and/or the video stream satisfies a criterion (e.g., matches the previously-stored user image data to a predetermined and/or acceptable probability), the analyzer 121 can send one or more signals to the database interface 122 indicative of an instruction to store at least the portion of the image and/or video stream data in the database 140 and to associate and/or otherwise store that data with the previously-stored user image data. In some instances, the analyzer 121 can send signals to the database interface 122 such that individual frames are stored in the database 140, which in turn, can be subsequently retrieved and processed to define a video stream. In other instances, the analyzer 121 can send one or more signals to the database interface 122 such that the portion of the video stream data is stored in the database 140. That is to say, the analyzer 121 can at least partially redefine and/or reconstruct the video stream from the individual frames (that were separated or deconstructed as described above).

In some instances, the host device 110 can receive image data (e.g., from the image capture system 160 and via the network 105 and the communication interface 125) and the analyzer 121 and/or any other suitable module not shown in FIG. 2, can perform one or more pre-processing and/or pre-sorting procedures prior to performing the facial recognition process (described above). For example, in some embodiments, the analyzer 121 (or other module) can analyze the video stream data to determine and/or define a data set including, for example, identifying information and/or contextual information such as location, time, event, image and/or video identifier, etc. Once defined, the analyzer 121 can analyze user data stored in the database 140 (e.g., via sending a signal to the database interface 122 indicative of an instruction to query the database 140 and/or the like) to determine if a portion of data associated with a user satisfies a criteria(ion) such as matching the data set including the contextual information associated with the image data.

In some instances, the criteria(ion) can be associated with a confidence level and/or matching threshold, represented in any suitable manner (e.g., a value such as a decimal, a percentage, and/or the like). For example, in some instances, the criteria(ion) can be a threshold value or the like such as a 70% match of the image data and at least a portion of the data stored in the database, a 75% match of the image data and at least a portion of the data stored in the database, a 80% match of the video image and at least a portion of the data stored in the database, a 85% match of the image data and at least a portion of the data stored in the database, a 90% match of the image data and at least a portion of the data stored in the database, a 95% match of the image data and at least a portion of the data stored in the database, a 97.5% match of the image data and at least a portion of the data stored in the database, a 99% match of the image data and at least a portion of the data stored in the database, or any percentage therebetween.

In some instances, the data associated with the user can include, for example, calendar data, location data, preference data, and/or the like. If, for example, the data does not satisfy the criterion, the analyzer 121 can define an indication that the data associated with that user can be excluded from, for example, the facial recognition process. In this manner, the pre-processing and/or pre-sorting can reduce an amount of processing load or the like during the facial recognition process. Although described above as querying the database 140 for the user data, in some embodiments, the host device 110 can send a signal to a device associated with the user (e.g., the client device 150*a/b*) indicative of a request for location data or the like associated with that device. Upon receipt of the location data (e.g., global positioning service (GPS) data of the device, using location information and/or characteristics, such as landmark and/or background scenery, within an image or video, etc.) or the like, the analyzer 121 can determine if the location data matches the location data associated with the video stream, as described above.

By way of example, in some instances, analyzer 121 can receive image data (including video stream data) from a sporting event that also includes location data associated with, for example, an arena. In response, the analyzer 121 can send a request for location data from a client device (e.g., the client device 150) associated with a user. If, for example, the location data associated with the image data and the location data associated with the client device are substantially similar (e.g., the location data associated with the image data and the location data associated with the client device indicate that the source of the image and the client device are and/or were within a predetermined distance of each other) and/or the location data associated with the client device is within a predetermined range of location data values or the like, the analyzer 121 can increase a confidence score and/or otherwise consider the result as contributing to meeting the threshold and/or otherwise satisfying the criteria(ion).

The location data can be, for example, geo-location data based on a GPS, network location and/or data (e.g., via NFC verification, Bluetooth verification, cellular triangulation, cognitive network switching and/or protocols, etc.), social network data such as a "check-in", and/or the like. For example, the location analyzer 124 can process the location data so as to identify the location of the video stream and/or the user, and to provide data to the analyzer 121 so as to allow the analyzer 121 to modify the confidence score. In this manner, the confidence score can be calculated based on the location data.

In other implementations, the location analyzer 124 can process the location data and can provide the processed location data to the analyzer 121 when location data associated with the image and location data associated with the user are substantially similar (e.g., the location data associated with the image and the location data associated with the client device indicate that the source of the video stream and the client device are and/or were within a predetermined distance of each other). The analyzer 121 can then generate and/or modify a confidence score based on the location data and a facial recognition analysis of the image. In this manner, the confidence score may be generated and/or modified when the location data associated with the image and location data associated with the user are determined to be substantially similar and may not be generated and/or modified when the location data associated with the image and location data associated with the user are not substantially similar. Further, in this manner, the confidence score can be calculated as a result of both a location data analysis and a facial recognition analysis. In this manner, the host device 110 (e.g., via the analyzer 121) can determine, for example, a proximity of a client device to a location where the video stream data was captured.

In some implementations, the analysis section 121 can generate and/or modify the confidence score based on ID information associated with the image data received by the host device 110. For example, the analysis section 121 can compare the ID information contained in the second contextual data (e.g., from second client device 150*b*) with the ID information contained in the first contextual data (e.g., from first client device 150*a*). If the ID information matches each other, the host device 110 can determine that the second contextual data was generated in response to receiving a wireless signal from the first client device and that was sent by the first client device in response to generating the image data and further determine that the potential presence of the second user in the image data. The host device 110 can further modify the confidence score using facial recognition. For example, the analysis section 121 can compare the image data against the facial data of the second user. If the host device 110 finds a match in the image data, the host device 110 can increase the confidence score. If the host device 110 does not find a match in the image data, the host device can decrease the confidence score.

Although described as analyzing location data, in other instances, the analyzer 121 can analyze data associated with any suitable source, activity, location, pattern, purchase, etc. For example, in some instances, the analyzer 121 can analyze ticket sales associated with a venue. In other instances, the analyzer 121 can analyze social media posts, comments, likes, etc. In some instances, the analyzer 121 can collect and/or analyze data associated with a user (as described above) and can define, for example, a user profile that can include, inter alia, user identification data, facial data, client device data, purchase data, internet web browsing data, location data, social media data, preference data, etc. Thus, a user's profile data can be analyzed to determine a confidence score, value, and/or indicator, which can be evaluated relative to a threshold score, value, and/or indicator to determine if the user data and/or the video stream data satisfy the criteria(ion). Accordingly, in such embodiments, non-facial data (e.g., ticket sales data, social media posts, and/or characteristics such as a wardrobe of an individual in a video or image, location data such as landmarks within the image, background scenery data, etc.) can be used to corroborate the facial data and/or increase/decrease a confidence score.

Although the analyzer 121 is described above as analyzing the image data to define facial data and contextual data associated with the image, in other embodiments, the facial recognition process and the contextual data process can be performed separately and/or independently. For example, in some embodiments, the analyzer 121 can be configured to perform the facial recognition process while a different module, processor, device, server, etc. can be configured to perform the contextual data process. For example, the location analyzer 124 can perform analysis of the image and/or video stream based on location data, characteristics of the image, and/or the like. Thus, a time to analyze the video stream data can be reduced and/or the processing load can be distributed when compared to the facial recognition process and the contextual data process being performed by the same module.

As described above, the database interface 122 includes a set of instructions executed by the processor 120 (or portion thereof) that is associated with monitoring the database 140 and/or updating data stored therein. For example, the database interface 122 can include instructions to cause the processor 120 to update data stored in the database 140 with at least a portion of the facial data received from the analyzer 121. More specifically, the database interface 122 can receive, for example, the user image data associated with the user from the analyzer 121 and, in response, can store the user image data in the database 140. In some instances, the database interface 122 can receive a signal from the analyzer 121 indicative of a request to query the database 140 to determine if the data stored in the database 140 and associated with the user image data for the user matches any suitable portion of the video stream data and/or image data, as described above. If, for example, at least a portion of the video stream data and/or image data satisfies a criteria(ion) (referred to henceforth as "criterion" for simplicity and not to the exclusion of multiple "criteria"), the database interface 122 can be configured to update the data stored in the database 140 associated with that user. That is to say, if at least a portion of the video stream data and/or image data matches the previously provided user image data within a predetermined probability or the like. If, however, the video stream data and/or image data does not match the previously provided user image data stored in the database 140, the database interface 122 can, for example, query the database 140 for the next entry (e.g., data associated with the next user) and/or can otherwise not update the database 140. Moreover, the database interface 122 can be configured to store the data in the database 140 in a relational-based manner (e.g., the database 140 can be a relational database and/or the like) and/or in any other suitable manner.

The presenter 123 includes a set of instructions executed by the processor (or a portion thereof) that is associated with defining a contextual image and/or presentation representing at least a portion of the image data satisfying the criterion during the facial recognition process, as described above. More specifically, the presenter 123 can be configured to define a contextual image and/or presentation representing an identified user (e.g., via facial recognition) at an event, venue, location, and/or the like. Once the contextual image is defined, the presenter 123 can send a signal associated with the contextual image to the communication interface 125, which in turn, can send a signal (e.g., via the network 105) to the client device 150a/b that is indicative of an instruction to graphically render the contextual image and/or video stream on its display.

Although the presenter 123 and/or other portion of the host device 110 is described above as sending a signal to the client device 150a/b indicative of an instruction to present the contextual image on the display of the client device 150a/b, in other instances, the presenter 123 can define the contextual image and can send a signal to the database interface 122 indicative of an instruction to store the contextual image in the database 140. In such instances, the data associated with the contextual image can be stored and/or otherwise associated with the user data stored in the database 140.

In some instances, the host device 110 can retrieve the contextual image from the database 140 in response to a request from the client device 150a/b (and/or any other suitable device). More specifically, in some embodiments, the user can manipulate the client device 150a/b to access a webpage on the Internet. After being authenticated (e.g., entering credentials or the like) the user can interact with the webpage such that a request for access to the contextual image is sent from the client device 150a/b to the host device 110. Thus, the host device 110 (e.g., the database interface 122) can retrieve the contextual image from the database 140 and can send a signal to the client device 150a/b operable in presenting the contextual image on the display (e.g., by rendering the contextual image via the Internet and the webpage). In other words, the contextual image can be stored on the "cloud" and accessed via a web browser and the Internet.

Although the analyzer 121, the database interface 122, and the presenter 123 are described above as being stored and/or executed in the host device 110, in other embodiments, any of the modules can be stored and/or executed in, for example, the client device 150 and/or the image capture system 160. For example, in some embodiments, the client devices 150 can include, define, and/or store a presentation module (e.g., as a native application). The presentation module can be substantially similar to or the same as the presenter 123 of the host device 110. In such embodiments, the presentation module of the client devices 150 can replace the function of the presenter 123 otherwise included and/or executed in the host device 110. Thus, the presentation module of the client devices 150 can receive, for example, a data set associated with a contextual image and upon receipt, can define a presentation to be presented on the display of the client devices 150.

Figure 3:
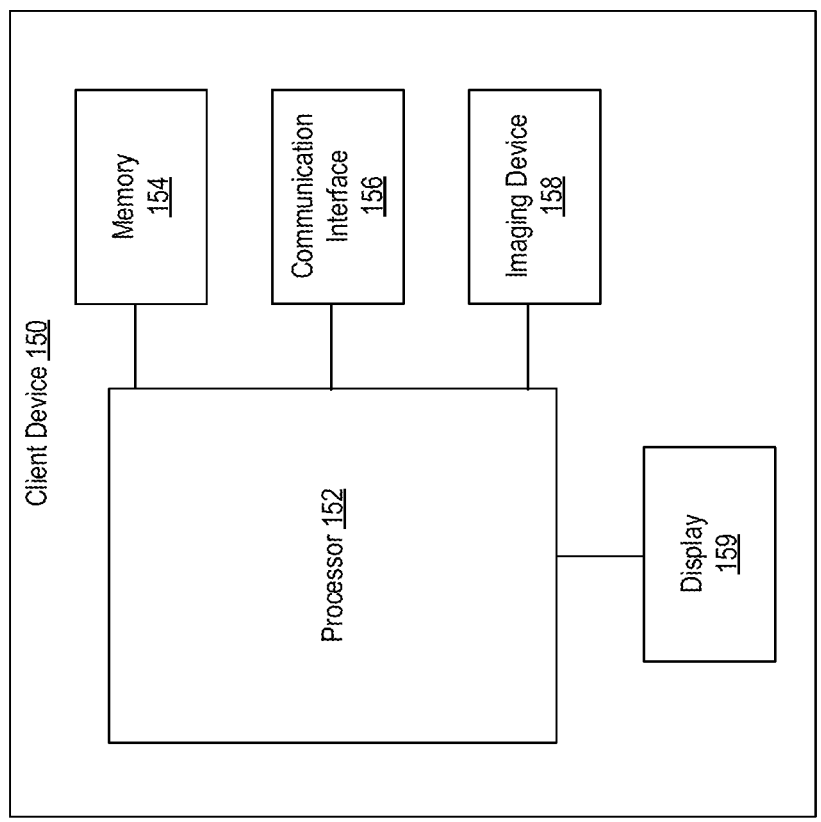
FIG. 3 is a schematic illustration of a client device included in the recognition system of FIGS. 1A and 1B.

FIG. 3 is a schematic illustration of a client device 150 included in the recognition system of FIGS. 1A and 1B. The client device 150 includes a processor 152 operably coupled to a memory 154, a communication interface 156, an optional imaging device 158, and an optional display 159. The client device 150 can be configured either as the first client device 150a or the second client device 150b.

In some implementations, the first client device 150a and the second client device 150b can be interchangeable. For example, a first user using the first client device 150a can take an image of the field of view including the second user using the second client device 150*b*, and the host device 110 can identify the second user in the image data based on methods described herein and send the image data to the second user. On the other hand, the second user using the second client device 150*b* can also take an image of the field of view including the first user, and the host device 110 can identify the first user in the image data and send the image data to the first user.

When configured as the first client device in the recognition system 100, the client device 150 includes the imaging device 158 configured to generate image data representative of a field of view. The communication interface 156 is also in communication with the imaging device 158 and configured to communicate via a network (e.g., network 105). In some instances, in response to the imaging device 158 generating the image data, the processor 120 is configured to control the communication interface 156 to broadcast a wireless signal covering at least a portion of the field of view. The wireless signal includes at least a portion of first contextual data associated with the image data. The processor 152 is also configured to control the communication interface 156 to send the image data and the first contextual data associated with the image data to a server (e.g., host device 110) via the network such that, in response to receiving the image data, the server determines a potential presence of a user in the image data based on comparing the first contextual data with second contextual data associated with the user of a second client device and generated in response to the second client device receiving the wireless signal. The server also analyzes the image data based on at least one of two-dimensional facial recognition analytics, three-dimensional facial recognition analytics, or a convolutional neural network (CNN) to identify the user in the image data.

When configured as the second client device in the recognition system 100, the client device 150 includes the communication interface 156 and the processor 152. The processor is configured to control the communication interface 156 to receive, from a first device, a wireless signal including first contextual data associated with image data generated by an imaging device associated with the first device. The first device is further configured to send the image data and the first contextual data to a server. In response to receiving the first contextual data, the processor 152 is configured to control the communication interface 156 to send second contextual data to the server such that in response to receiving the second contextual data, the server determines a potential presence of a user in the image data based on comparing the first contextual data with the second contextual data. The server also analyzes the image data based on at least one of two-dimensional facial recognition analytics, three-dimensional facial recognition analytics, or a convolutional neural network (CNN) to identify the user in the image data. The processor 152 in the client device 150 is also configured to receive the image data from the server in response to the server identifying the user in the image data. The processor 152 can further control the display 159 to display the received image data.

With the apparatus and systems shown in FIGS. 1A-3, various methods of image analysis can be implemented. Some example methods are described below with references to FIGS. 4-6.

Figure 4:
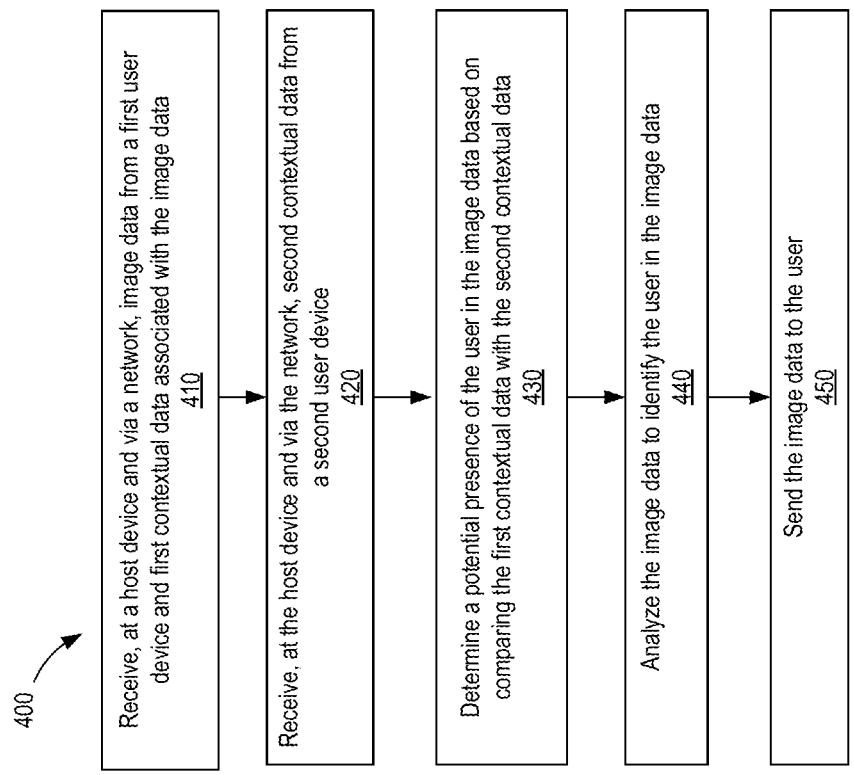
FIG. 4 is a flowchart illustrating a method of using a host device in a video recognition system according to an embodiment.

FIG. 4 is a flowchart illustrating a method 400 of using a host device in a recognition system shown in FIGS. 1A and 1B, according to an embodiment. In the method 400, the host device (e.g., host device 110) receives image data from a first user device that can include an image capture system such as the image capture system 160 (e.g., a camera and/or client device) described above with reference to FIGS. 1A and 1B, at 410. The host device also receives first contextual data associated with the image data. More specifically, the host device can receive the image data either directly (e.g., from one or more cameras via the network) or indirectly (e.g., from a computing device via the network, which in turn, is in communication with the one or more cameras).

The image data includes at least one image of a field of view. The field of view (e.g., a scene captured by the image capture system in the at least one image) can include various types of venues, such as sporting events, concerts, rallies, graduations, summer camps, or any other suitable situations. In some instances, for example, the image data can be captured and/or taken by a user of a first user device (e.g., 150*a*). The user can be an attendee of an event. In other instances, the image data can be captured and/or taken by the host of the event. For example, the image data can be captured and/or taken by one or more fixed cameras installed and/or controlled by the host of the event. In another example, the image data can be captured and/or taken by one or more photographers associated with the event (e.g., hired by the host). In some instances, the image data can be captured and/or taken by a third party, such as a camera associated with a television station.

In one example, a camera can record the image data, and can send the image data to the host device. In another example, a user can record image(s) through an application running on a client device (e.g., first client device 150*a*) operated by the user (e.g., via a User-Generated Content (UGC) interface within the application running on the client device). By initiating recording through the application (e.g., by clicking a "Capture", "Record" and/or similar button in the UGC interface), the user can capture and/or record one or more images, with which the client device can associate first contextual data. The contextual data can include, for example, location data (e.g., geolocation data, data from Near Field Communication (NFC), data from Bluetooth communications with other devices, cellular triangulation, event and/or location check-in data, and/or network Wi-Fi connection information), timing data (e.g., from a clock operably coupled with the image capture system), ID data (e.g., serial number generated by the client device for each image or video) and/or the like. As an example, the host device can tag the image with the location data, timing data, and/or ID data, and/or can associate the image with a data structure encapsulating the location data, timing data and/or ID data.

At 420, the host device receives second contextual data from a second user device (e.g., 150*b* in the system 100). The second contextual data can be associated with a user of the second user device or the second user device itself. The second contextual data is generated in response to the user device receiving a wireless signal, which is sent, in response to the imaging device generating the image data, by an antenna operably coupled to the imaging device. The wireless signal can be based on any suitable wireless technology, such as, for example, WiFi®, Bluetooth®, radio frequency (RF), 3G, 4G, 5G, optical communication, and/or infrared communication, among others.

In some implementations, the second user device receives the wireless signal via one protocol (e.g., Bluetooth) and sends the second contextual data to the host device via another protocol (e.g., WiFi). In some embodiments, the second device uses the same protocol to receive the wireless signal and send the second contextual data.

The wireless signal can cover at least a portion of the field of view of the image data. Similarly stated, the wireless signal can be broadcast such that user devices (such as the second user device) within a proximity of the first user device can receive the wireless signal. In some implementations, the wireless signal is broadcast by the first user device such that the wireless signal is sent to an area surrounding the first user device. In some other implementations, the wireless signal is directed toward the field of view. The directed wireless signal can reduce the number of user devices that might receive the wireless signal and thus send contextual data to the host device, and accordingly increase the accuracy of the subsequent facial recognition by reducing the number of possible users in the image data. Similarly stated, because the wireless signal that triggers the second user device to send second contextual data to the host device is directed toward the same field of view of the image data, as long as the host device receives second contextual data from a user device, the chance that the user of the user device is within the image data is high.

In some implementations, the first user device includes a camera associated with a venue. In these instances, the camera can be operably coupled to an antenna (or a computing device including an antenna). When the camera takes an image or a video, the antenna is configured to send out the wireless signal. For example, a controller, such as a control station or console, can be used to control both the camera and the antenna, in which case the instruction sent to the camera to capture an image or a video is also employed to control the antenna to send out the wireless signal. In another example, the camera can include a communication interface to communicate with the antenna (or the computing device). When the camera captures an image or a video, the communication interface is configured to send a signal to the antenna (or the computing device), causing the antenna to send out the wireless signal.

At 430, the host device determines a potential presence of the user in the image data based on comparing the first contextual data with the second contextual data. The comparison between the first contextual data and the second contextual data can be carried out in multiple implementations.

In some implementations, for example, in response to receiving the wireless signal from the first user device, the second user device sends the second contextual data including identification (ID) information associated with the image data, the user and/or the second user device to the host device and a second timestamp. The second timestamp can be, for example, the time of receiving the wireless signal or the time of sending the second contextual data. The first contextual data sent by the first user device includes a first timestamp representing the time of generating the image data. By comparing the two timestamps, the host device can determine whether the user is potentially present in the image data.

In other implementations, for example, the first and second contextual data can include first and second location information representing the locations of the first user device and the second user device, respectively. By comparing the first location information with the second location information, the host device can also determine the likelihood that the user is present in the image data.

In yet another example, the wireless signal sent by the first user device can include ID information associated with the image data and/or the first user device (e.g., a serial number). In response to receiving the wireless signal, the second user device can forward at least part of the ID information to the host device. The first user device also sends the same ID information to the host device (e.g., contained in the first contextual data). The host device can then determine the likelihood of the user's presence in the image data based on whether the ID information in the second contextual data matches the ID information in the first contextual data.

In some implementations, both the first contextual data and the second contextual data can be sent to the host device by the second user device. For example, the wireless signal can include the first contextual data and the second user device then forwards this first contextual data (together with the second contextual data or as part of the second contextual data) to the host device. The first contextual data can include ID information associated with the first user device and/or the image data. The host device can then determine that the second user device is in proximity of the first user device based on the fact that ID information associated with the first user device and/or the image data is contained in data from the second user device.

At 440, the host device analyzes the image data to identify the user in the image data. In some instances, the host device can analyze the image data based on and/or using at least one of two-dimensional facial recognition analytics, three-dimensional facial recognition analytics, or a convolutional neural network (CNN) to identify the user in the image data. For example, the host device can receive the image data and can analyze and/or process the image data to determine if a portion of the image data matches any suitable portion of facial image data stored in the database (e.g., database 140). That is to say, the host device can use the facial image data as a template against which the image data is compared.

In some instances, a criterion of a positive facial recognition can be, for example, associated with a matching of the image data with the facial image data with a predetermined and/or acceptable probability. In some embodiments, the image data includes a video stream, and the host device can be configured to analyze and/or process the video stream based at least in part on separating, parsing, sorting, and/or otherwise deconstructing the video stream into its individual frames (e.g., a static image at a predetermined time during the video stream). As such, the host device can compare and/or analyze data included in the video stream frame relative to the facial image data.

The facial recognition at 440 performed by the host device can be either before or after the comparison of the first contextual data with the second contextual data at 430. In other words, the order of 430 and 440 can be freely arranged.

In some implementations, the host device compares the first contextual data with the second contextual data to determine the potential presence of the user in the image data (e.g., if the user is close to the first client device). The host device then performs facial recognition on the image data to search for this particular user. The host device can confirm the presence of this particular user if the facial recognition also returns a positive match. In this manner, the host device can reduce the number of users to search for in a particular media file, and reduce false positives by tying the user's contextual data and the user's appearance to the data obtained from the media. In some implementations, the host device does not perform facial recognition to search for users (or any person) who are not identified based on the comparison of the first contextual data with the second contextual data (e.g. from step 430). In such implementations, processing at the host device can be reduced. False positives associated with the facial recognition analysis can also be reduced.

In other implementations, the host device can perform facial recognition to identify the possible users in the image data prior to comparing contextual data. The host device then compares the second contextual data with the first contextual data to determine the potential presence of the user associated with the second user device, after which the host device can determine whether the user associated with the second user device is within the possible users identified from facial recognition. If positive, the host device can then determine that the user is indeed present in the image data.

At 450, the host device sends the image data to the user. The image data sent to the user is also referred to as a "contextual image" because the user is identified based at least in part on contextual data, as described herein. Similarly, if the image data includes a video stream, the video stream sent to the user is referred to as a "contextual video steam" because the user is identified based at least in part on contextual data, as described herein. A contextual image of the user is defined when the criterion associated with facial recognition of the facial image data in the image data is satisfied. For example, when the host device determines that at least a portion of the data in the image data satisfies a criterion (e.g., matches the facial image data to a predetermined and/or acceptable probability), the host device can define the contextual image of the user and can store the contextual image of the user in the database. With the contextual image of the user defined, the host device sends the image data to the user, at 450. For example, the host device can send a signal indicative of an instruction to present the contextual image of the user on a display of the client device (e.g., by graphically rendering the contextual image in an interface instantiated on the client device 150b). In some instances, the host device can send a signal to the client device, via the network, that is operable in presenting the contextual image of the user on the display of the client device.

In some instances, the host device can also send a message to the first user who took the image data indicating that one or more other users were identified in the image data. The host device can also suggest the second user adding the identified users as friends on one or more social media platforms.

In some instances, the host device can also ask the second user to identify and/or confirm the presence of users in the image data. For example, in the event that host device does not recognize a person in the image data, the host device can ask the first user for suggestions of possible identities of that person. In another example, in the event that the host device recognizes a person in the image data but the confidence level does not meet a criterion (e.g., is not above a threshold), the host device can ask the first user to confirm the tentative recognition.

In other instances, the host device can store the contextual image (e.g., in the database or the like) and can be configured to retrieve the contextual image of the user from the database in response to a request from the second user device (and/or any other suitable device). More specifically, in some embodiments, the user can manipulate the client device to access a webpage on the Internet and/or to login to an application. After being authenticated (e.g., entering credentials or the like) the user can interact with the webpage and/or application such that a request for access to the contextual image is sent from the client device to the host device. Thus, the host device can retrieve the contextual image from the database and can send a signal to the client device operable in presenting the contextual image on the display (e.g., by graphically rendering the contextual image via the Internet and the webpage) and/or otherwise allow the client device to download the image. Similarly stated, the contextual image can be stored on the "cloud" and accessed via a web browser and/or an application and the Internet.

In other implementations, when a contextual image satisfies the criterion (e.g., when the contextual image matches the facial image data of the user to a predetermined probability, and/or the like), the host device can automatically send the contextual image to the user. For example, in some implementations, the user may also be operating the second user device instantiating an application that is tracking user location data for that user. When an image capture device (e.g., such as an autonomous camera and/or another user device) records image data, the host device can determine that the image data matches the user based on a facial analysis of the image data and facial image data associated with the user. The user's client device can also send location data associated with the user and the client device to the host device. The host device can refine, using both the facial analysis and the location information, the probability that the user appears in the image data. If the probability that the user appears in the image data satisfies a criterion (e.g., exceeds a predetermined threshold, and/or the like), the host device can send the contextual image to the user. Alternatively, the host device can pre-filter the image data based on the location information, such that the probability is calculated when location information of the user is substantially similar to location information of the image data, and does not calculate the probability when the location data of the image data is not substantially similar to the location information of the user.

In other implementations, when image data satisfies the criterion (e.g., when the image data matches the facial image data of the user to a predetermined probability, and/or the like), the host device can store the image data and associate the image data with the user based on the user's interaction with the image data. For example, in some implementations, the user can access an application instantiated on a client device associated with the user, to search for and/or access the image data. The user can, for example, view the image data within the user profile of another user associated with that user, and/or can search for image data to view within an interface of the application. When the user accesses the image data within the application, the application can send a signal to the host device indicating that the user is accessing that image data. The host device can automatically determine whether or not a facial analysis of the image data has been performed based on the facial image data associated with that user, and can automatically perform a facial analysis of the image data, based on that user's facial image data, if the user's facial image data has not been previously compared to the image data. In this manner, the host device can delay processing the image data to identify users within the image data until users attempt to access the image data.

In some instances, a user can search for an event and "check-in" to that event after the event. For example, the user can identify an event (e.g., by viewing a list of events, by viewing location of events on a map, etc.) and can select an event. Based on the user's selection of the event, the host device can perform a facial analysis of the image data associated with that event based on that user's facial image data. If the host device identifies an image including the user (e.g., with a predetermined probability), the host device can provide such image to the user.

While the method 400 is described above as sending and/or receiving image data, contextual data, etc. and presenting and/or sharing user-specific image data with one or more users, it should be understood that a system can be arranged such that video stream data and/or image data can be captured in any suitable manner, analyzed by any suitable device, and sent to and/or shared with any suitable user or user device. By way of example, in some instances, a user can manipulate a user device (e.g., client device such as the client devices 150) to capture a facial image of the user. For example, the user can open a mobile application (e.g., when the user or client device is a smartphone or other mobile or wearable electronic device) and can capture a facial image (e.g., a "selfie") via a camera of the client device. In other words, the user can control the camera of the client device via the application to capture a selfie. Such a selfie can be provided to register a user such that the application can identify facial data (e.g., facial feature characteristics) of the user. This facial data can be used to identify the user in subsequently received videos and/or images.

In some instances, the user can capture content (e.g., image data and/or a video stream) via the application. As described above, the content can be an image and/or a video stream of one or more people in a given context such as, for example, one or more people at a sporting event or the like. In some instances, the user captured (e.g., generated) content can be associated with contextual data such as a time, date, location, venue, event, etc. and/or can otherwise be tagged with data and/or metadata.

In other instances, the user generated content need not be associated with contextual data. The user generated content (e.g., video stream data or the like) can be analyzed via facial recognition and/or other image analysis via the client device or a host device to determine the presence of any registered user (e.g., any user with a user profile stored in the database). If a registered user is identified in the video stream, the user, the client device, and/or the host device can define a user-specific video stream associated with one or more of the identified users. The user, the client device, and/or the host device can then determine whether to share the user-specific video stream with each identified user.

In some instances, the sharing of the user-specific video stream(s) can be automatic based on a user-profile and/or preference and/or based on a setting or the like within the mobile application or account. In other instances, the sharing of the user-specific video stream(s) can be based on a manual or other input from the user (e.g., based on a selection or the like). In still other instances, the sharing of the user-specific video stream(s) can be based on a peer networking session, in which each user (or each client device used in the peer networking session) receives a user-specific video stream. In this manner, the user generated content (e.g., the user captured video stream and/or image data) can be captured, analyzed, and/or shared in a similar manner as those described herein.

The method 400 can further include a registration procedure to register a user in a facial recognition database. The registration procedure can include receiving, at the host device and from a client device (e.g., either first client device or second client device) via the network, a signal indicative of a request to register facial image data associated with a user. For example, in some embodiments, the network can be any suitable network or combination of networks such as, for example, the network 105 described above with reference to FIG. 1. The host device can be substantially similar to or the same as the host device 110 described above with reference to FIGS. 1A, 1B, and 2. Similarly, the client device can be substantially similar to or the same as the client devices 150 described above with reference to FIGS. 1-3. In some instances, the client device can be configured to capture initial facial image data and can send the initial facial image data to the host device. Specifically, in some embodiments, the client device can be configured to capture a user's facial image or images in any suitable manner. Accordingly, the host device can receive facial image data from the client device and can perform any suitable process or the like associated with registering a user and/or the user's facial image data.

The registration procedure also includes registering the facial data associated with the user and storing the facial data in a database in communication with the host device. The database can be any suitable database such as, for example, the database 140 described above with reference to FIG. 1. The registering of the facial data can include any suitable process, method, and/or algorithm associated with facial recognition such as those described above. In some instances, the host device can be configured to define user image data or the like based on the facial recognition and can store at least a portion of the user image data in the database.

In some implementations, the registration procedure can be carried out concurrently with other steps in the method 400. For example, the user of the second user device can include an image of the second user (e.g., a selfie) in the second contextual data. The host device can first register the second user or update the registration of the second user, and then perform the rest of the steps in the method 400, such as comparing the first and second contextual data, facial recognition, and sending the contextual image to the second user if applicable.

In some implementations, the method 400 can be adapted to conduct image analysis without a wireless signal being sent by the first user device and received by the second user device. More specifically, the second user device can generate the second contextual data periodically and/or on a schedule. For example, the second user device can send location information (as part of the second contextual data) of the second user device to the host device, and the first contextual data includes location information of the first user device. The host device can then compare the location information of the first user device with the location information of the second user device. If the two locations are within a predetermined value (e.g., 1 meter, 2 meters, 5 meters, 10 meters, or any other suitable value), the host device can then determine that the user associated with the second user device is potentially present in the image data generated by the first user device. In these implementations, the second user device can send the second location information to the host device periodically, e.g., every 0.1 second, every 0.5 second, every 1 second, every 2 seconds, or any other suitable frequencies.

In some implementations, the first contextual data can also include first timing information associated with the image data (e.g., time at which the image was taken), and the second contextual data can include second timing information representing the time at which the second contextual data was sent to the host device. The host device can further compare this first timing information with the second timing information. If the two times are within a threshold value of each other (e.g., 3 minutes, 2 minutes, 1 minute, 30 seconds, 15 seconds, or less, including any values and sub ranges in between), the host device can then determine that the second user is potentially present in the image data.

Figure 5:
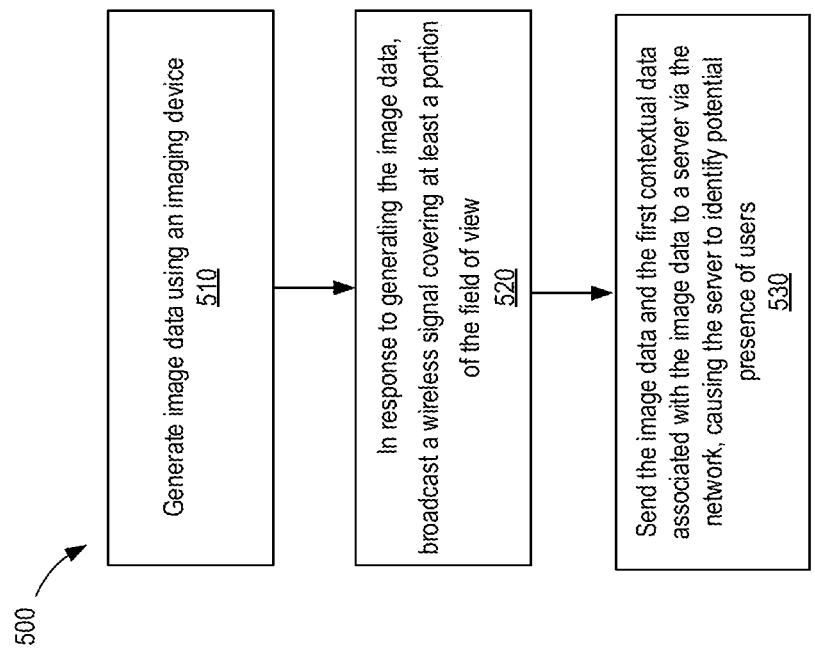
FIG. 5 is a flowchart illustrating a method of using a client device including an imaging device in a video recognition system according to an embodiment.

FIG. 5 is a flowchart illustrating a method 500 of using a client device including an imaging device in a video recognition system, according to an embodiment. The method 500 can be implemented using, for example, a first user device (e.g., the first client device 150a in the system 100 shown in FIGS. 1A and 1B). In this method 500, the first user device generates image data using an imaging device (e.g., representative of a field of view), at 510. In some instances, the image data can be generated using the imaging device included in the first user device. In other instances, the image data can be generated using an imaging device operably coupled to the first user device. For example, the imaging device can include a camera at a stadium. The camera can communicate with a computing device (e.g., computer or phone) and transmit the acquired image data (including video) to the computing device, which in turn sends the image data to the host device.

At 520, in response to the imaging device generating the image data, the first user device can control the communication interface to broadcast a wireless signal covering at least a portion of the field of view of the image data. The wireless signal includes at least a portion of first contextual data associated with the image data. As described above, the first contextual data can include information representing the location of the first user device, the time of acquiring the image data, ID information (e.g., serial number) assigned to the image data, ID information associated with the first user device, and/or ID information associated with an operator of the first user device, among others.

In some implementations, the wireless signal is automatically sent when the image data is captured. In other implementations, the operator of the first user device can control the first user device to withhold the wireless signal. For example, the operator can take an image of a scene without any person in the image, in which case the operator of the first user device can prevent and/or restrict the first user device from broadcasting a wireless signal so as to reduce the computing load of the first user device and/or the server.

At 530, the first user device sends the image data and the first contextual data associated with the image data to a server (e.g., host device 100 in the system 100) via the network such that the server performs image analysis. The image analysis includes determining a potential presence of a user in the image data based on comparing the first contextual data with second contextual data. The second contextual data is associated with the user of a second user device and generated in response to the second user device receiving the wireless signal. The image analysis also includes analyzing the image data based on at least one of two-dimensional facial recognition analytics, three-dimensional facial recognition analytics, or a convolutional neural network (CNN) to identify the user in the image data.

As described above, the second contextual data can include, for example, location information of the second user device, time of receiving the wireless signal from the first user device, time of sending the second contextual data, and ID information associated with the second user device and/or the second user, among others. The second contextual data can also include at least a portion of information contained in the wireless signal, such as the ID information of the image data.

Figure 6:
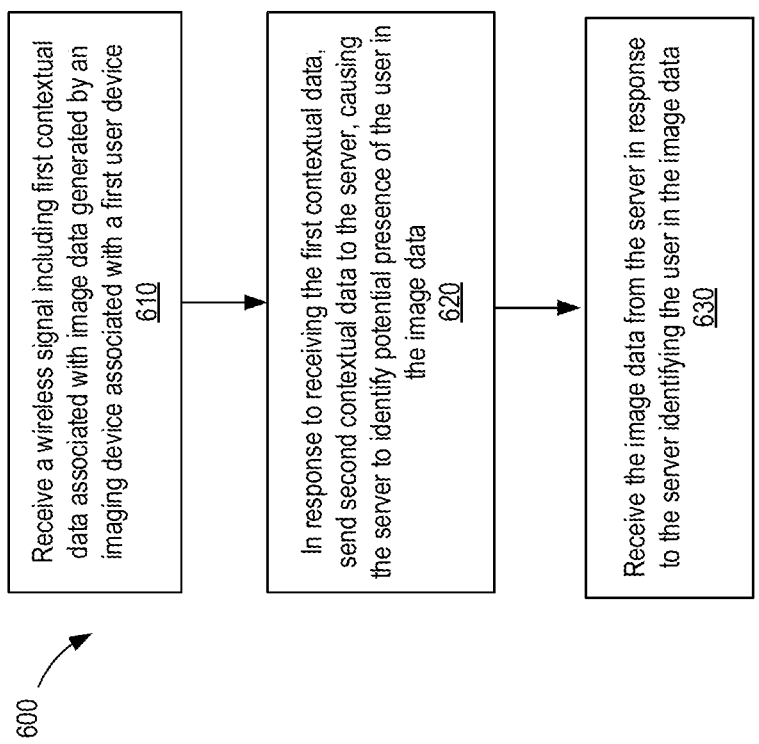
FIG. 6 is a flowchart illustrating a method of using a client device in a video recognition system according to an embodiment.

FIG. 6 is a flowchart illustrating a method 600 of using a client device in a video recognition system according to an embodiment. The method 600 can be implemented using, for example, a second user device (e.g., the second client device 150*b* in the system 100 shown in FIGS. 1A-1B). In this method 600, the second user device receives, from a first user device, a wireless signal including first contextual data associated with image data generated by an imaging device associated with the first device, at 610. The first device is further configured to send the image data and the first contextual data to a server.

At 620, in response to receiving the first contextual data, the second user device sends second contextual data to the server such that in response to receiving the second contextual data, the server performs image analysis. The image analysis includes determining a potential presence of a user in the image data based on comparing the first contextual data with the second contextual data. The image analysis also includes analyzing the image data based on at least one of two-dimensional facial recognition analytics, three-dimensional facial recognition analytics, or a convolutional neural network (CNN) to identify the user in the image data.

In some implementations, the second contextual data is sent automatically in response to receiving the wireless signal from the first user device. In other implementations, the second user can have the option to turn off the transmission of the second contextual data (e.g., to protect privacy) and/or the user provides approval prior to sending the second contextual data.

At 630, the second user device receives the image data from the server in response to the server identifying the user in the image data. Alternatively, the second user device receives an indication that the second user is identified in one or more images (or video streams), thereby prompting the second user to review the images stored on the host device (or a database associated with the host device).

In some implementations, the second user device receives a request to confirm the recognition performed by the host device. The second user can have the option to "de-tag" the recognition (e.g., to protect privacy). In some implementations, the second user can have the option to suggest a new recognition. For example, the second user can provide identity information of persons in the image data, and the host device can conduct the facial recognition again based on this identity information.

Figure 7:
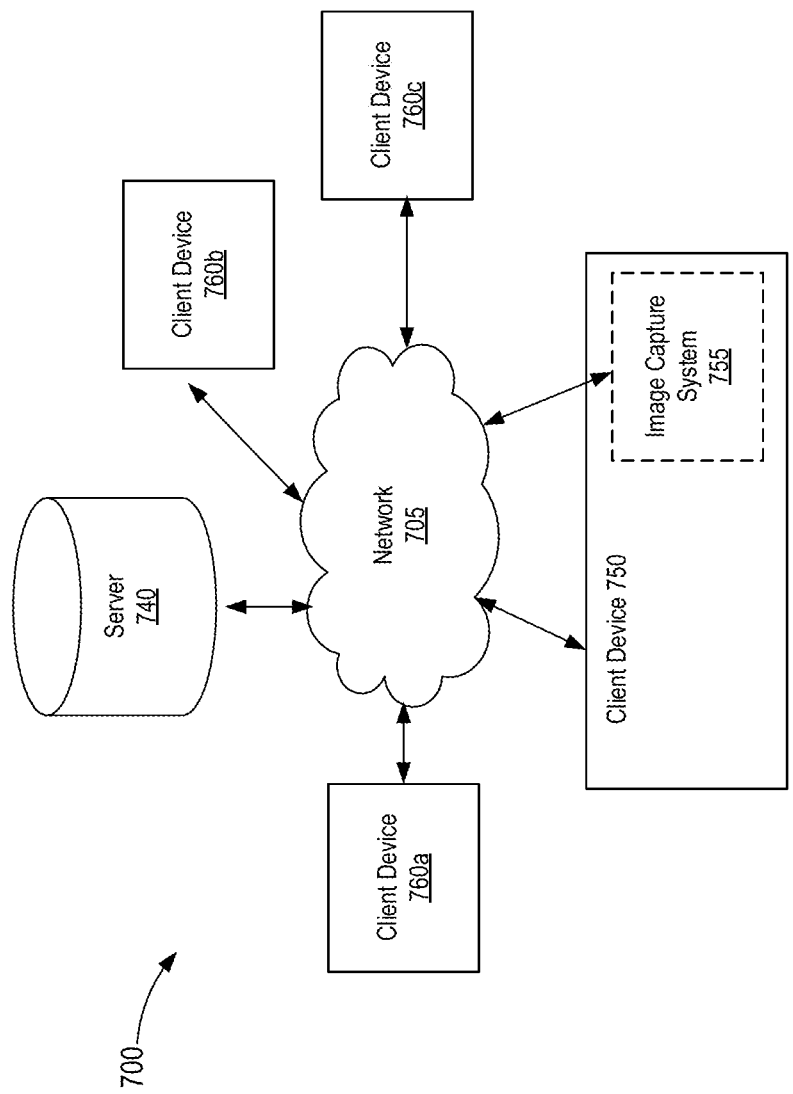
FIG. 7 is a schematic illustration of a system including a client device for facial recognition, according to an embodiment.

FIG. 7 is a schematic illustration of a system 700 including a client device 750 for facial recognition (e.g., facial verification and/or facial matching) according to an embodiment. The client device 750 includes an image capture system 755 configured to generate image data (e.g., by taking one or more photos and/or videos). In some embodiments, the client device 750 can be substantially similar to the client device 150*a* shown in FIGS. 1A-1B and FIG. 3 and can be, for example, a PC, a laptop, a convertible laptop, a tablet, a personal digital assistant (PDA), a smartphone, a wearable electronic device (e.g., a smart watch, etc.), and/or any other suitable compute device and/or mobile device. The client device 750 (also referred to as a sending device 750, a user device 750, or a compute device 750) is in communication with a set of other client devices 760*a* to 760*c* (also referred to as receiving devices 760 or compute devices 760) and a server 740 via a network 705. In addition, in some embodiments, each receiving device (e.g., 760*a*, 760*b*, and/or 760*c*) is also in communication with the server 740. In some embodiments, the server 740 can be substantially similar to the host device 110 shown in FIGS. 1A-1B and FIG. 2 and the receiving devices 760 can be substantially similar to the client device 750.

In operation, the sending device 750 is configured to generate image data and a request signal. In some embodiments, the request signal can be substantially similar to the wireless signal described above with reference to, e.g., FIGS. 1-6. In some embodiments, the request signal is generated automatically. For example, the sending device 750 can be configured to generate the request signal when (and in response to) a new image is taken by the image capture system 755. In some embodiments, the sending device 750 can be configured to automatically generate the request signal during a predetermined time window (e.g., during a certain event).

In some implementations, the sending device 750 can be configured to generate the request signal at any other suitable time and/or in response to any other suitable event. In some implementations, for example, the sending device 750 can generate and send the request signal periodically, sporadically, in response to a user opening an application and/or requesting that a request signal be generated and sent, in response to entering an event, a venue or other location, in response to a user checking-in at an event and/or venue, and/or the like. In such implementations, the sending device 750 can then store facial data received in response to the request signal for a predetermined amount of time (e.g., associated with the event) and use the stored facial data to perform facial recognition on subsequently captured images, as described in further detail herein. In such implementations, the sending device 750 may not send a request signal each time an image is taken by the image capture system 755.

In some embodiments, the sending device 750 is switchable between at least two operation modes. In the first operation mode, the sending device 750 is configured to automatically generate the request signal when a new image is acquired by the image capture system 755. In the second operation mode, the sending device 750 is configured to generate the request signal when a user associated with the sending device 750 instructs the sending device 750 to do so. For example, upon the acquisition of a new image, the sending device 750 can present a menu including several options for the user to select. One of the options can include generation of the request signal. Another option can include saving the image without sending any request signal. A third option can include deleting the image.

In some embodiments, the request signal includes at least a portion of the image data (e.g., the new image acquired by the image capture system 755). In some embodiments, the request signal includes processed image data. For example, the request signal can include a faceprint extracted from the image acquired by the image capture system 755. As used herein, a faceprint includes a numerical code that includes multiple nodal points characterizing the face of a person. The nodal points can represent facial features, such as, for example, distance between the eyes, width of the nose, depth of the eye sockets, the shape of the cheekbones, the length of the jaw line, and/or the like.

In some embodiments, the request signal does not include image data. Instead, the request signal can include contextual data associated with the image data. For example, the request signal can include a location of the sending device 750 when the image data was generated. In another example, the request signal can include timing information about the image data. In yet another example, the request signal can include information about an event associated with the image data (e.g., wedding, sports event, concert, etc.).

In some embodiments, the request signal can include a text string or a command requesting facial data (e.g., the request signal does not include images or contextual data). The receiving devices 760 can be configured to parse the request signal to determine whether a response signal is to be sent. For example, the receiving devices 760 can determine the identity of the sending device 750 from the request signal (e.g., based on the metadata) and send the response signal to the sending device in the event that the sending device 750 is a recognized device.

In some embodiments, the sending device 750 is configured to present a menu for the user to select the type of the request signal. The menu can include one or more of the following options: request signal including the image, request signal including processed image data, request signal including image data and contextual data, request signal including processed image data and contextual data, request signal including contextual data alone, request signal including a command to request image data, and/or any other suitable options.

The user can select one of the options based on, for example, connectivity condition of the sending device 750. For example, in the event that the sending device 750 has a good network connection (e.g., with WiFi connection), the user can choose to have the request signal include the image. The user can also select the type of the request signal based on privacy considerations. For example, in the event that the image acquired by the image capture system 755 includes multiple persons, the user may not wish to show the image to every possible candidate in the image. In this case, the user can choose to have the request signal include contextual data but no image data. The user can also select the type of the request signal based on one or more other restrictions. For example, the user may be attending an event with restrictions on distributing images to the public (e.g., due to copyright concerns). In this case, the user can choose to have the request signal include the contextual data but no image data.

In some embodiments, the sending device 750 is configured to send the request signal automatically. For example, the sending device 750 is configured to send the request signal upon generation of the request signal without human intervention. In some embodiments, the sending device 750 is configured to send the request signal only if the user approves (e.g., by affirmatively selecting the option to send out the request signal).

In some embodiments, the sending device 750 is configured to broadcast the request signal to receiving devices 760 via any suitable communication protocol (e.g., via NFC, Bluetooth, Wi-Fi and/or any other suitable protocol). In some embodiments, the broadcast is toward the field of the view of the image capture system 755. In some embodiments, the broadcast is toward receiving devices 760 within the same venue of the sending device 750 and/or within a predetermined range of the sending device 750 (e.g., a transmission range). Each receiving device 760, upon receiving the request signal, can be configured to send a response signal back to the sending device 750. In some embodiments, the response signal includes facial data, such as a faceprint of one or more persons, a facial recognition vector, facial recognition data, facial characteristic data, facial matching data, and/or the like. For example, the facial data can be associated with the user of the receiving device 760. In another example, the facial data can be associated data of more than one person (e.g., contacts associated with the receiving device), and the response signal can further include ID and/or contact information associated with each person.

In some embodiments, upon receiving the request signal that includes image data or processed image data, each receiving device 760 is configured to perform facial recognition to identify an identity and/or a match of one or more persons in the image data. In addition, each receiving device 760 is also configured to generate the response signal including information about the identified person(s). In some implementations, an identity of a person in the image data is not identified (e.g., information that can easily be used to identify the person is not identified), but a match is identified between the received facial data and the image data. In such implementations, contact information and/or an identifier associated with the person can be provided with the response signal. Such contact information and/or identifier can be used to provide the image to the person. Not identifying an identity of a person but still identifying a match can increase privacy, while still allowing easy sharing of images and/or videos.

In some embodiments, the receiving devices 760 are configured to install an application that can control the operation of the receiving devices 760 upon receiving the request signal. For example, the user of the sending device 750 and the users of the receiving devices 760 can be registered users of the application and/or a service associated with the application. The request signal can be generated by the application and include ID information indicating that the request signal is generated by the application. Upon receiving the request signal, the receiving devices 760 can recognize that the request signal is generated by the application and accordingly control the receiving devices to take actions, such as sending facial data to the sending device 750 and/or perform facial recognition. These actions can be implemented by the receiving devices 760 without human intervention, e.g., in the background of the receiving devices 760.

In some embodiments, the receiving devices 760 are configured to evaluate the request signal before taking further actions. In these embodiments, the request signal can include contextual data associated with the image data, and the receiving devices 760 can be configured to analyze the contextual data to determine whether a response signal is to be sent back to the sending device 750. For example, the contextual data can include location information of the sending device 750, and each receiving device 760 can determine whether that receiving device 760 is in a predetermined proximity of the location information. In the event that a receiving device 760 is indeed within the predetermined proximity of the sending device 750, the receiving device 760 can send the response signal. In the event that a receiving device 760 is not within the predetermined proximity of the sending device 750, the receiving device 760 can choose not to response. Alternatively, the receiving device 760 can send a response signal indicating that the receiving device 760 is not in the proximity of the sending device 750.

In another example, the contextual data can include event information associated with the image data, and each receiving device 760 can determine whether that receiving device 760 is in the same event. If so, that receiving device 760 can then send the response signal back to the sending device. If not, that receiving device 760 can choose not to respond or to send a response signal indicating that that receiving device 760 is not near the event.

In another example, in some implementations, a receiving device 760 can request confirmation from a user of that receiving device 760 prior to sending the response signal to the sending device. If the user does not provide confirmation, the receiving device 760 can discard the request signal and not provide any response to the sending device.

In some embodiments, the sending device 750 is configured to send the request signal to the server 740 (e.g., rather than broadcasting the request signal directly to the receiving devices), which, in response to receiving the request signal, sends facial data associated with potential candidates in the image data to the sending device 750 (and the sending device 750 can then perform facial recognition using the received facial data). In some embodiments, the receiving devices 760 can be configured to periodically and/or sporadically send contextual data (also referred to as candidate contextual data) to the server 740, and the request signal sent by the sending device 750 includes contextual data associated with the image data (also referred to as sender contextual data). The server 740 can then compare the sender contextual data with the candidate contextual data so as to identify potential candidates. For example, the contextual data can include location information, and the server 740 can compare the location of the sending device 750 with locations of the receiving devices 760 (e.g., included in the candidate contextual data) to identify potential candidates (e.g., those receiving devices 760 that are within a preset distance from the sending device 750). In these embodiments, the receiving devices 760 do not actually receive the request signal sent by the sending device 750, and the term receiving devices 760 is used for consistency.

In embodiments where the server 740 provides facial data to the sending device 750, such facial data can be encrypted such that the server 740 cannot access the underlying facial data. Specifically, as discussed in further detail herein, receiving devices 760 can encrypt facial data using an encryption key (symmetric or asymmetric) and send the facial data for storage at the server 740 (e.g., as part of a registration process for a service). The sever 740 may not have access to the corresponding decryption key and may not be able to access the facial data, preserving the privacy of the facial data. The server 740 can store the encrypted facial data with contextual data (e.g., location data) associated with a receiving device 760. When the server 740 identifies the receiving device 760 as a potential candidate based on the contextual data, the server 740 can send the encrypted facial data to the sending device 750. The sending device 750 can store and/or obtain a copy of the decryption key, as described herein, decrypt the facial data and perform facial recognition.

In some embodiments, the receiving devices 760 do not perform facial recognition (e.g., facial verification and/or facial matching); instead, the receiving devices 760 are configured to send response signals including facial data to the sending device 750 (either directly or via the server 740). In these embodiments, upon receiving the response signals including the facial data, the sending device 750 is configured to perform facial recognition based on the received facial data and the image data to determine the presence of one or more persons in the image data and/or a match between the received facial data and the image data. In some implementations, an identity of a person in the image data is not identified (e.g., information that can easily be used to identify the person is not identified), but a match is identified between the received facial data and the image data. In such implementations, contact information and/or an identifier associated with the person can be received with the response signal. Such contact information and/or identifier can be used to provide the image to the person, as described in further detail herein. Not identifying an identity of a person but still identifying a match can increase the privacy of the method, while still allowing easy sharing of images and/or videos.

In some embodiments, the receiving devices 760 are configured to perform facial recognition. In these embodiments, the receiving devices 760 are configured to generate response signals including the results of the facial recognition performed by the receiving devices. For example, the response signals can include identity and/or contact information and/or an identifier associated with person(s) in the facial recognition performed by the receiving devices 760. In these embodiments, the sending device 750 can tag one or more persons in the image data based on the facial recognition results. In some embodiments, the response signals do not include identity information and instead include an indication of a match and an identifier associated with the match. The identifier can be used to share the image and/or video with the user associated with that identifier (e.g., the server can correlate the identifier with contact information, an account and/or a device of the user). This can further protect the privacy and identity of individuals in the video and/or image.

In some embodiments, the sending device 750 is configured to send (or otherwise provide access to) the image data and/or the facial recognition results to person(s) identified in the image data. In some implementations, this can include sending the image data and/or the facial recognition results to a compute device associated with the person, sending the image data and/or the facial recognition results to a server with an identifier associated with the person such that the person can later retrieve the image data and/or the facial recognition results from the server (e.g., via an application interface, a website and/or the like), posting the image to a social media account of the person, and/or any other suitable method for providing the image data and/or the facial recognition results to the person identified in the image and/or video.

In some implementations of the system 700, the facial recognition is performed on client devices 750 and/or 760, instead of on the server 740, thereby protecting the privacy of users associated with the client devices 760. In some implementations, the server 740 can be configured not to store facial data of the users. Instead, in such implementations, the server 740 can be configured to coordinate the communication between the sending device 750 and the receiving devices 760 (e.g., authenticating that the sending device 750 is associated with a registered user). In some implementations, as discussed above, the server is not used at all and the client devices 750 and/or 760 can communicate directly with each other in a peer-to-peer manner (e.g., via NFC, Bluetooth, Wi-Fi and/or any other suitable protocol), further reducing and/or eliminating the user data stored on and/or communicated through a server. While the client devices 750 and 760 are referred to as clients, it should be understood that the embodiments and/or implementations described herein are not limited to traditional host-client relationships. Any of the embodiments described herein can include client devices in a peer-to-peer implementation without the use of a particular host device or server. In such implementations, a client device can be, for example, any suitable user controlled device such as any of those described herein.

Figure 8:
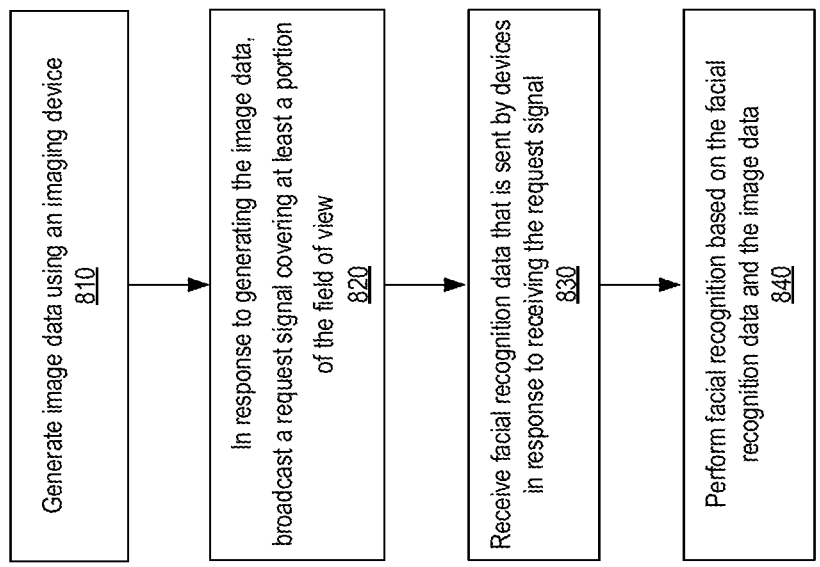
FIG. 8 is a flowchart illustrating a method of facial recognition using a client device, according to an embodiment.

FIG. 8 is a flowchart illustrating a method 800 of facial recognition using a client device (e.g., similar to the client device 750 shown and described with respect to FIG. 7), according to an embodiment. The method 800 includes, at 810, generating image data using an imaging device (e.g., the image capture system 755). The method 800 also includes, in response to the generation of the image data, broadcasting a request signal to cover at least a portion of the field of view of the imaging device, at 820. The request signal can include, for example, the image data, contextual data associated with the image data and/or a command, request or instruction for a receiving device to provide facial data. The broadcast can be implemented by a sending device associated with the imaging device and using any suitable communication protocol (e.g., Bluetooth, Wi-Fi, NFC, etc.).

The request signal is configured to cause devices that receive the request signal (also referred to as receiving devices) to send a response signal in response to receiving the request signal. In some embodiments, a response signal from a receiving device includes facial data (e.g., faceprint) of a user of the receiving device. In addition, the response signal can include ID information about the receiving device and/or the user of the receiving device.

At 830, the sending device is configured to receive the facial data. Based on the received facial data and the image data, the sending device can perform facial recognition to identify an identity and/or a match of one or more persons in the image data, at 840. In some implementations, an identity of a person in the image data is not identified (e.g., information that can easily be used to identify the person is not identified), but a match is identified between the received facial data and the image data. In such implementations, contact information and/or an identifier associated with the person and/or the receiving device can be provided with the received facial data. Such contact information and/or identifier can be used to provide the image to the person and/or receiving device. Not identifying an identity of a person but still identifying a match can increase the privacy of the method, while still allowing easy sharing of images and/or videos.

In some embodiments, the method 800 also includes sending or otherwise providing the facial recognition results to the person(s) identified in the image data. For example, the sending device can be configured to generate an annotated image including the image data and the tagging of person(s) identified in the image data. In some embodiments, the sending device is configured to share the image (or the annotated image) with person(s) identified in the image (or otherwise provide the image to the person(s), as described herein).

In some implementations, the request signal can include a public key of the sending device. In such implementations, a receiving device can use the public key of the sending device to encrypt the facial data and/or any other portion of the response signal. Upon receiving the response signal, the sending device can decrypt the facial data (and/or other portion of the response signal) using a private key paired to that public key. The decrypted facial data can then be used to perform facial recognition.

In some embodiments, the receiving devices are configured not to perform any facial recognition. In these embodiments, the sending device is configured to collect potentially relevant facial data from candidate persons and then confirm (or preclude) the presence of the candidate persons in an image and/or video based on facial recognition.

In some embodiments, the method 800 can be implemented automatically without human intervention (although in some instances, step 810 can be performed by a user while the other steps are implemented automatically without human intervention). For example, the users of the sending device and the receiving devices can be registered users of an application and/or a service associated with the application. An instance of the application is installed in the sending device and each receiving device. Upon generation of the image data, the sending device is configured to automatically broadcast the request signal. Upon receiving the signal, the receiving devices can recognize that the request signal is sent from a registered user and therefore automatically send back the response signal, thereby allowing the sending device to perform facial recognition.

In some embodiments, the sending device is configured to store the facial data received from the receiving devices. In some embodiments, the storage of the facial data is for a predetermined period of time. For example, the sending device can be configured to store the facial data only during the period of an event. In this case, during the event, the sending device can reuse the facial data for facial recognition of multiple images. For example, after receiving the facial data from a receiving device (e.g., in response to a request signal), when additional images are captured by the sending device, the sending device can perform facial recognition using the already received facial data in an attempt to identify individuals and/or a match in the image prior to sending another request signal. In some instances, for example, if the individuals in the image can be identified and/or a match is identified using the stored facial data, a request signal is not sent and the image can be provided, distributed and/or made available to such individuals. In some embodiments, the sending device is configured to discard the facial data after facial recognition is performed (e.g., to protect privacy of the users of the receiving devices). In such embodiments, a request signal can be sent each time an image is captured by a sending device.

Figure 9:
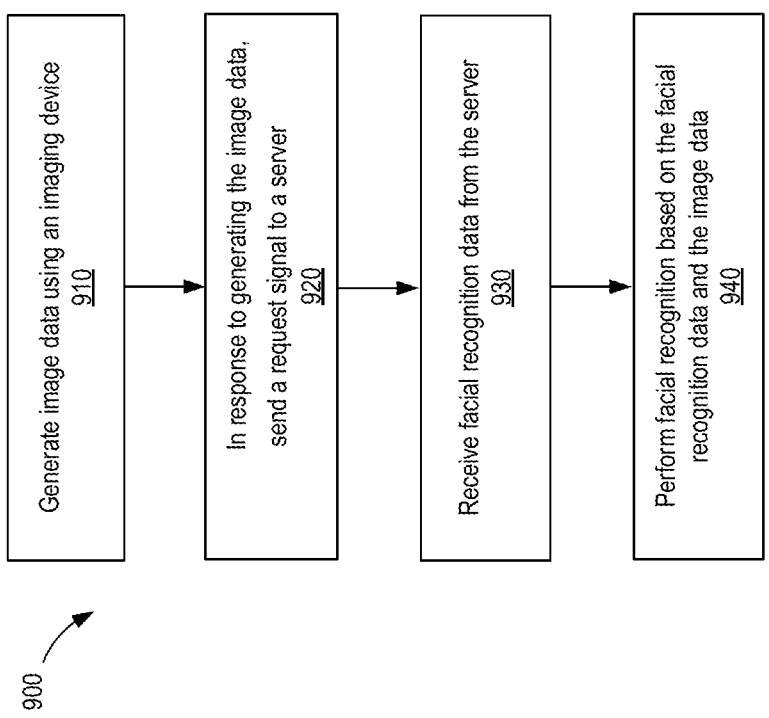
FIG. 9 is a flowchart illustrating a method of facial recognition based on data received from a server, according to an embodiment.

FIG. 9 is a flowchart illustrating a method 900 of facial recognition based on data received from a server according to an embodiment. The method 900 includes, at 910, generating image data using an imaging device. In response to generating the image data, a request signal is sent to a server (e.g., the server 740 in FIG. 7) by a sending device associated with the imaging device, at 920. The server is configured to store facial data of persons that might be present in the image data (also referred to as candidate persons).

In some embodiments, such facial data stored by the server can be encrypted such that the server cannot access the underlying facial data. Specifically, as discussed in further detail herein, receiving devices can encrypt facial data using an encryption key (symmetric or asymmetric) and send the facial data for storage at the server (e.g., as part of a registration process for a service). The sever may not have access to the corresponding decryption key and may not be able to access the facial data, preserving the privacy of the facial data. The server can store the encrypted facial data with contextual data (e.g., location data) associated with a receiving device. Such contextual data can be received from receiving devices as discussed above (e.g., periodically, sporadically, in response to an event, etc.).

Upon receiving the request signal, the server is configured to retrieve such facial data associated with candidate persons. In some embodiments, the request signal includes contextual data associated with the image data, and the server is configured to receive contextual data associated with multiple client devices (e.g., client devices 760). The server can then identify candidate persons based on comparing the contextual data from the sending device with contextual data from the client devices. For example, the contextual data can include location information and/or event information that can be used by the server to identify candidate persons. When the server identifies a person associated with a receiving device as a potential candidate person based on the contextual data, the server can send the encrypted facial data to the sending device.

The method 900 also includes, at 930, receiving the facial data from the server. In some implementations, the received facial data can be encrypted. The sending device can have and/or obtain a copy of the decryption key. For example, in some implementations, the encryption/decryption key can be a symmetric encryption/decryption key that can be encrypted using a public key of the sending device and sent from the receiving device to the sending device (e.g., either directly or via the server) such that the sending device can decrypt the symmetric encryption/decryption key using a private key of the sending device. The symmetric encryption/decryption key can then be used to decrypt the received facial data. In some instances, the server can store and/or provide the public key of the sending device to the receiving device (e.g., the server can store the public keys of devices, subscribers and/or users of a service such that receiving devices can obtain public keys of sending devices). In response to receiving the public key of the sending device, the receiving device can encrypt the symmetric encryption/decryption key and send the encrypted symmetric encryption/decryption key to the sending device.

Based on the received facial data and the image data, the sending device can perform facial recognition to identify an identity and/or a match of one or more persons in the image data, at 940. In some embodiments, the method 900 also includes sending (or otherwise providing) the facial recognition results and/or image to the person(s) identified in the image data. For example, the sending device can be configured to generate an annotated image including the image data and the tagging of person(s) identified in the image data. In some embodiments, the sending device is configured to share and/or provide the image (or the annotated image) with person(s) identified in the image.

In some implementations, an identity of a person in the image data is not identified (e.g., information that can easily be used to identify the person is not identified), but a match is identified between the received facial data and the image data. In such implementations, contact information and/or an identifier associated with the person can be provided with the received facial data. Such contact information and/or identifier can be used to provide the image to the person. Not identifying an identity of a person but still identifying a match can increase the privacy of the method, while still allowing easy sharing of images and/or videos.

In some embodiments, the server is configured not to perform facial recognition on the image data generated by the sending device. For example, the sending device can be configured to send contextual data but not image data to the server for the server to identify candidate persons. In other words, the request signal does not include the image data.

In some implementations, the server does not store facial data (in encrypted or non-encrypted form), but acts as an intermediary between a sending device and a receiving device. In some implementations, for example, the server can store contextual data (e.g., location data) associated with receiving devices. In response to generating an image, the sending device can send contextual data associated with the image to the server. In some implementations, such a request can include a public key of the sending device. In other implementations, the server can store a copy of the public key of the sending device. If the contextual data of a receiving device matches the contextual data associated with the image (e.g., the location data of a receiving device is within a predetermined distance of the location data of the image), the server can send a request for facial data with the public key of the sending device to the receiving device. The receiving device can encrypt facial data of an individual associated with the receiving device using the public key of the sending device and send the encrypted facial data to the server. The server can then send the encrypted facial data to the sending device. The sending device can decrypt the facial data using a private key paired with the public key and use the facial data to perform facial recognition on the image. Based on such an implementation, the server does not store facial data and receives facial data in encrypted form. Thus, the server is unable to access such facial data, increasing the privacy and user control of the facial data.

In some embodiments, encrypted facial data can be provided from a receiving device to a sending device in any other suitable manner. In some implementations, for example, the server can store contextual data and a public key associated with each device associated with a service provided by the server (e.g., that subscribes to and/or uses a service provided by the server). In response to the sending device capturing an image (e.g., using an image capture device), the sending device can send contextual data associated with the image to the server. If the contextual data associated with a receiving device matches the contextual data associated with the image, the server can send a public key of the receiving device to the sending device. The sending device can encrypt a symmetric key with public key of the receiving device and send the encrypted symmetric key to the receiving device (e.g., either directly or via the server). The receiving device can decrypt the encrypted symmetric key using a private key of the receiving device and can encrypt facial data of an individual associated with the receiving device using the symmetric key. The encrypted facial data can be sent to the sending device via the server and the sending device can decrypt the encrypted facial data using the symmetric key. The sending device can use the facial data to perform facial recognition on the image.

Figure 10:
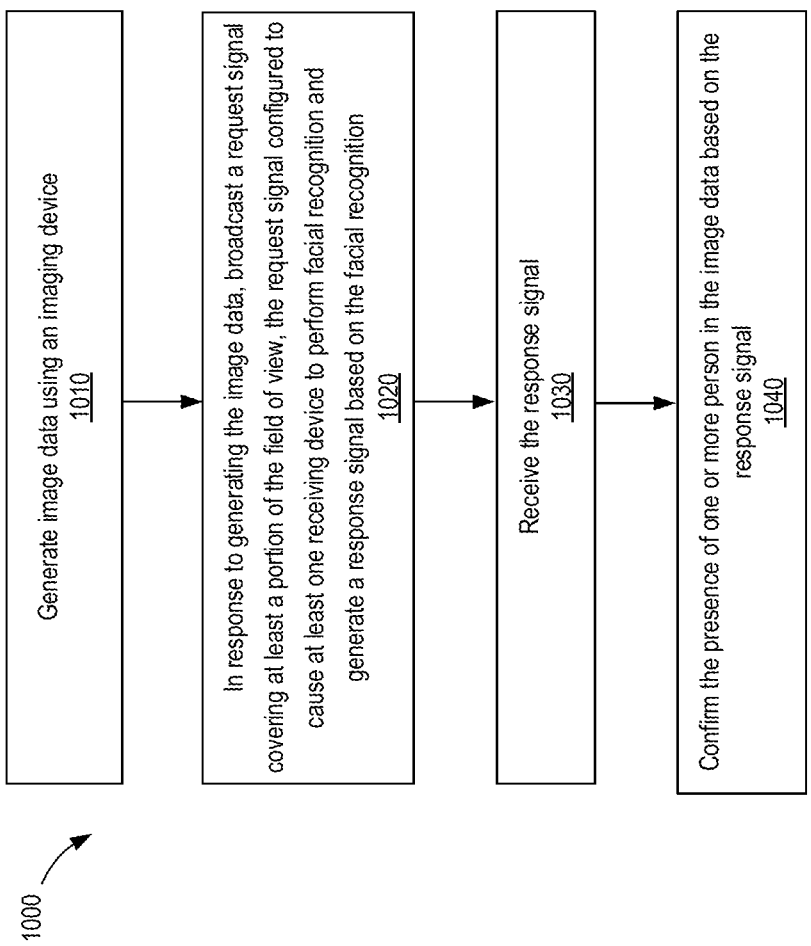
FIG. 10 is a flowchart illustrating a method of facial recognition implemented by a receiving client device, according to an embodiment.

FIG. 10 is a flowchart illustrating a method 1000 of facial recognition implemented by a receiving client device according to an embodiment. The method 1000 includes, at 1010, generating image data using an imaging device. The method 1000 also includes, at 1020, in response to generating the image data, broadcasting a request signal covering at least a portion of the field of view. The request signal is configured to cause at least one receiving device to perform facial recognition and generate a response signal based on the facial recognition.

In some embodiments, the request signal includes the image data (e.g., encrypted as discussed above or non-encrypted) for the receiving device to perform facial recognition. Alternatively, in some embodiments, the sending device is configured to send the image data to a server (e.g., the server 740 in FIG. 7), and the request signal can include contextual data (but no image data). For example, the contextual data can include location information and/or event information associated with the image data.

Upon receiving the request signal, the receiving device can determine whether the receiving device is within a predetermined proximity of the sending device. If so, the receiving device is configured to retrieve the image data from the server for facial recognition. If not, the receiving device is configured not to respond or instead send back a response signal to the sending device indicating that the receiving device is not in the proximity of the sending device. In these embodiments, the method 100 can be implemented with efficient use of the bandwidth of the sending device.

Moreover, in some embodiments, the sending device and the receiving devices can be configured to periodically send contextual data to a server. The server is configured to compare the contextual data so as to identify receiving devices that are in proximity to the sending device. The server is also configured to send the request signal, received from the sending device, to those receiving devices that are in proximity to the sending device. In these embodiments, the receiving devices (or the users associated with these receiving devices) can then decide whether to retrieve image data from the server for facial recognition. In some embodiments, the receiving devices (or the users associated with these receiving devices) can defer the facial recognition to a later time (e.g., when the network connection is better).

The method 1000 also includes, at 1030, receiving the response signal from the receiving device. In some embodiments, the response signal includes facial recognition results acquired by the receiving device, such as the ID information of person(s) identified and/or matched by the receiving device or an indication that a person is not identified and/or matched in the image data. At 1040, the sending device is configured to confirm the presence of the one or more persons in the image data based on the received response signal. In some embodiments, the sending device can tag the identified person(s) in the image data to generate an annotated image. In some embodiments, the sending device is configured to share the image (or the annotated image) with and/or provide the image to the person(s) identified in the image.

In some embodiments, as described above, the facial recognition is performed by the sending device or the receiving device that actually receives the request signal from the sending device. In some embodiments, the facial recognition can be performed by any other third-party device. For example, the receiving device that actually receives the request signal can delegate the task of facial recognition to another compute device (e.g., to take advantage of the computing power of the third-party device). The receiving device can then generate and send the response signal based on the facial recognition performed by the third-party device. Moreover, in some embodiments, after receiving facial data from a receiving device, the sending device can delegate the task of facial recognition to another compute device. For example, the sending device can send the facial data and the image data to a compute device (e.g., another client device within a predetermined proximity of the sending device) to perform the facial recognition. The results of the facial recognition can then be returned to the sending device.

While various embodiments have been described above, it should be understood that they have been presented by way of example only, and not limitation. For example, while the embodiments and methods have been described herein as defining a contextual image and/or video stream of a user at an event or the like and sending the contextual image and/or video stream to a client device and/or otherwise allowing access to the contextual image and/or video stream via, for example, a web browser and the Internet, in other embodiments, a host device can store, in a database, any number of contextual images and/or video streams associated with a user. In some instances, the host device can be configured to define a user profile or the like that can include any number of contextual images and/or video streams of the user. In some instances, the user can access his or her user profile via a mobile application, a computer application, a web browser and the Internet, and/or the like. Moreover, in some instances, the user can share or otherwise request the host device to share any number of contextual images and/or video streams of the user with a different user and/or via a social media site. In some instances, a user can allow access to a portion of his or her user profile such that other users can view the contextual images and/or video streams included therein.

While specific examples have been particularly described above, the embodiments and methods described herein can be used in any suitable manner. For example, while the system 100 is described above as defining a contextual image and/or video stream of a user at a sporting event, in other embodiments, the methods described herein can be used to identify an individual using, for example, facial recognition and video analytics in any suitable setting, venue, arena, event, etc. For example, in some implementations, the methods described above can be used to capture a contextual image and/or video stream at a concert, a rally, a graduation, a party, a shopping mall, a place of business, etc. In one example, a host device can receive a contextual video stream from, for example, a graduation. In some instances, as described above, the host device can perform any suitable facial recognition and/or video analytics to identify the graduate (and/or any individual and/or user). Moreover, the host device can be configured to analyze contextual information such as, a user profile associated with the graduate, an order of students walking across the stage, location data associated with the graduate's client device, and/or any other suitable data. As such, the host device can analyze the data to verify the identity graduate (e.g., when the data satisfies a criteria(ion)) and can define a contextual video stream of the graduate, for example, as he or she walks across the stage to receive a diploma or the like. In other instances, the host device can identify a family member or friend of the graduate and can define a contextual video stream of him or her in a similar manner.

While the embodiments have been described above as being performed on specific devices and/or in specific portions of a device, in other embodiments, any of the embodiments and/or methods described herein can be performed on any suitable device. For example, while the contextual images and/or video streams have been described above as being sent to a host device (e.g., the host device 110) for facial recognition and/or image analysis, in other embodiments, any suitable analysis can be performed on or at a client device. For example, in some instances, a user can capture a video stream (e.g., a contextual video stream) via a camera of the client device and in response, the client device can analyze the video to identify any number of registered users or the like in the video stream. In some instances, the analysis can be via a convolutional neural network sent to and/or stored on the client device (e.g., stored in memory and associated with the system application). In some instances, the analysis can be pre-processed and/or pre-sorted based on, for example, the user's contact list, friends list, established connections, contextual data, etc., as described above. In some instances, the client device can send a user-specific video stream to any identified user, as described above. In other embodiments, the client device can upload and/or send the analyzed video stream and/or the user-specific video stream(s) to the host device 110 and/or the database 140.

While video streams and/or image data is described above as being "contextual," it should be understood that the video stream data and/or image data can be independent of and/or unassociated with "contextual data." For example, in some instances, a user can capture a video stream and/or image and can upload the video stream and/or image for processing without defining and/or sending contextual data associated with the video stream and/or image data. In some instances, a host device or the like (e.g., the host device 110) can receive the user-generated video stream and/or image data and in response, can perform one or more facial recognition processes and/or any other suitable analytics on the data to define, for example, a user-specific video stream or user-specific image that is independent of contextual data. As used herein, a user-specific video stream or user-specific image can be defined with or without using contextual data. For example, the host device can be configured to identify a user in an image by analyzing the image against facial data of the user stored in the database without using contextual data.

While the embodiments have been particularly shown and described, it will be understood that various changes in form and details may be made. Although various embodiments have been described as having particular features and/or combinations of components, other embodiments are possible having a combination of any features and/or components from any of embodiments as discussed above.

Where methods and/or events described above indicate certain events and/or procedures occurring in certain order, the ordering of certain events and/or procedures may be modified. Additionally, certain events and/or procedures may be performed concurrently in a parallel process when possible, as well as performed sequentially as described above. While specific methods of facial recognition have been described above according to specific embodiments, in some instances, any of the methods of facial recognition can be combined, augmented, enhanced, and/or otherwise collectively performed on a set of facial data. For example, in some instances, a method of facial recognition can include analyzing facial data using Eigenvectors, Eigenfaces, and/or other 2-D analysis, as well as any suitable 3-D analysis such as, for example, 3-D reconstruction of multiple 2-D images. In some instances, the use of a 2-D analysis method and a 3-D analysis method can, for example, yield more accurate results with less load on resources (e.g., processing devices) than would otherwise result from only a 3-D analysis or only a 2-D analysis. In some instances, facial recognition can be performed via convolutional neural networks (CNN) and/or via CNN in combination with any suitable two-dimensional (2-D) and/or three-dimensional (3-D) facial recognition analysis methods. Moreover, the use of multiple analysis methods can be used, for example, for redundancy, error checking, load balancing, and/or the like. In some instances, the use of multiple analysis methods can allow a system to selectively analyze a facial data set based at least in part on specific data included therein.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware sections may include, for example, a general-purpose processor, a field programmable gate array (FPGA), and/or an application specific integrated circuit (ASIC). Software sections (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. A user device, comprising:
   a camera configured to capture an image;
   a communication module configured to broadcast a request signal within a selected range of the user device, the request signal being configured to be received by other user devices within the range, the request signal including a request for facial data;
   the communication module being further configured to receive a response in a peer-to-peer manner from at least one other user device in the range that received the request signal, the response including facial data corresponding to a user of the at least one other user device; and
   a processor configured to perform facial recognition on the image using the facial data of the response received from the at least one other user device to identify a match between the facial data of the response and facial data from the image, the processor being configured to associate an identified match with the response from the at least one other user device that includes the facial data resulting in the match,
   wherein the processor is configured to cause the communication module to transmit the image to the at least one other user device in the peer-to-peer manner based upon the processor identifying the match.

2. The user device of claim 1, wherein the communication module is configured to receive the response and transmit the image by communicating directly with the at least one other user device.

3. The user device of claim 1, wherein the processor is configured to store the facial data of the response for a predetermined time period within memory associated with the processor.

4. The user device of claim 3, wherein
   the camera is configured to capture a second image;
   the processor is configured to perform facial recognition using the facial data stored within the memory to identify a match between the facial data stored in the memory and facial data from the second image.

5. The user device of claim 3, wherein the predetermined time period is associated with an event and the processor is configured to delete the facial data from the memory based on a conclusion of the event.

6. The user device of claim 1, wherein the processor is configured to discard the facial data of the response subsequent to identifying the match.

7. The user device of claim 1, wherein the communication module is configured to broadcast the request signal using at least one of a Bluetooth, Near Field Communication (NFC) or Wi-Fi communication protocol.

8. The user device of claim 1, wherein the processor is configured to cause the communication module to broadcast the request signal based on the camera capturing the image or prior to the camera capturing the image.

9. The user device of claim 1, wherein
   the communication module is configured to receive a plurality of responses, each of the received responses being from a different user device within the range, each of the received responses including corresponding facial data; and
   the processor is configured to perform the facial recognition using the corresponding facial data of each of the plurality of responses and the facial data from the image to identify a plurality of matches.

10. The user device of claim 9, wherein
    the processor is configured to associate each of the plurality of matches with the one of the plurality of responses including the corresponding facial data resulting in the match; and
    the processor is configured to cause the communication module to send the image to each different user device that provided one of the plurality of responses including the corresponding facial data resulting in one of the plurality of matches.

11. A method, comprising:
    capturing an image using a camera of a first user device;
    broadcasting a request signal from a communication module of the first user device within a range of the first user device, the request signal being configured to be received by at least one second user device within the range, the request signal including a request for facial data;
    receiving a response in a peer-to-peer manner, by the communication module of the first user device, from the at least one second user device in the range that received the request signal, the response including facial data corresponding to a user of the at least one second user device;
    using a processor of the first user device to perform facial recognition on the image using the facial data of the response received from the at least one second user device to identify a match between the facial data of the response and facial data from the image;
    using the processor to associate an identified match with the response from the at least one second user device that includes the facial data resulting in the match; and
    using the processor to cause the communication module to send the image from the first user device to the at least one second user device in the peer-to-peer manner based upon the processor identifying the match.

12. The method of claim 11, wherein the receiving and the sending each comprise communicating directly between the first user device and the second user device.

13. The method of claim 11, comprising storing the facial data of the response for a predetermined time period within memory associated with the processor.

14. The method of claim 13, comprising
capturing a second image using the camera of the first user device; and
using the processor of the first user device to perform facial recognition using the facial data stored within the memory to identify a match between the facial data stored in the memory and facial data from the second image.

15. The method of claim 13, wherein the predetermined time period is associated with an event and the method includes deleting the facial data of the response from the memory based on a conclusion of the event.

16. The method of claim 11, comprising deleting the facial data of the response from the first user device subsequent to identifying the match.

17. The method of claim 11, wherein broadcasting the request signal comprises using at least one of a Bluetooth, Near Field Communication (NFC) or Wi-Fi communication protocol.

18. The method of claim 11, wherein broadcasting the request signal is based on the camera of the first user device capturing the image or is performed prior to the camera of the first user device capturing the image.

19. The method of claim 11, comprising
receiving a plurality of responses, each of the received responses being from a different second user device within the range, each of the received responses including corresponding facial data; and
using the processor of the first user device to perform the facial recognition using the corresponding facial data of each of the plurality of responses and the facial data from the image to identify a plurality of matches.

20. The method of claim 19, comprising
using the processor of the first user device to associate each of the plurality of matches with the one of the plurality of responses including the corresponding facial data resulting in the match; and
sending the image to each of the different second user devices that provided the one of the plurality of responses including the corresponding facial data resulting in one of the plurality of matches.

21. A non-transitory storage medium containing computer-executable instructions that, when executed by at least one processor of a user device, cause the at least one processor to:
cause a communication module of the user device to broadcast a request signal within a range of the user device, the request signal being configured to be received by other user devices within the range, the request signal including a request for facial data;
perform facial recognition on an image captured by a camera of the user device using facial data of a response received in a peer-to-peer manner from at least one other user device in the range to identify a match between the facial data of the response and facial data from the image, wherein the facial data of the response corresponds to a user of the at least one other user device; associate an identified match with the response from the at least one other user device that includes the facial data resulting in the match and
cause the communication module of the user device to transmit the image in the peer-to-peer manner to the at least one other user device based upon the processor identifying the match.

22. The non-transitory storage medium of claim 21, wherein
the instructions cause the at least one processor to store the facial data of the response in a memory of the user device; and
when the camera captures a second image, the instructions cause the at least one processor to perform facial recognition using the facial data stored within the memory to identify a match between the facial data stored in the memory and facial data from the second image.

23. The non-transitory storage medium of claim 21, wherein, when the communication module receives a plurality of responses, each of the received responses being from a different user device within the range, each of the received responses including corresponding facial data, the instructions cause the at least one processor to perform the facial recognition using the corresponding facial data of each of the responses and the facial data from the image to identify a plurality of matches.

24. The non-transitory storage medium of claim 23, wherein the instructions cause the at least one processor
to associate any identified match with the one of the plurality of responses including the corresponding facial data resulting in the match; and
cause the communication module to send the image to the one of the different user devices that provided the response including the corresponding facial data.

* * * * *